US011157930B1

(12) United States Patent
Bachu et al.

(10) Patent No.: US 11,157,930 B1
(45) Date of Patent: Oct. 26, 2021

(54) SYSTEMS AND METHODS FOR DEFINING CANDIDATE AND TARGET LOCATIONS BASED ON ITEMS AND USER ATTRIBUTES

(71) Applicant: Amazon Technologies, Inc., Seattle, WA (US)

(72) Inventors: Suresh Bachu, Andhra Pradesh (IN); Chitresh Madan, Haryana (IN); Sai Vamsi Krishna Medishetty, Telangana (IN); Abhinav Srivastava, Uttar Pradesh (IN); Swati Lnu, Uttar Pradesh (IN); Sravya Velagala, Gujarat (IN)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 16/019,298

(22) Filed: Jun. 26, 2018

(51) Int. Cl.
*G06Q 30/02* (2012.01)
*G06Q 10/08* (2012.01)

(52) U.S. Cl.
CPC ....... *G06Q 30/0205* (2013.01); *G06Q 10/087* (2013.01); *G06Q 30/0201* (2013.01); *G06Q 30/0202* (2013.01); *G06Q 30/0206* (2013.01)

(58) Field of Classification Search
None
See application file for complete search history.

(56) References Cited

U.S. PATENT DOCUMENTS

| | | | |
|---|---|---|---|
| 8,140,421 B1 * | 3/2012 | Humphries | G06Q 20/10 705/36 R |
| 9,805,411 B1 * | 10/2017 | Parihar | G06Q 30/0631 |
| 10,373,099 B1 * | 8/2019 | McCardel | G06Q 10/0833 |
| 10,423,922 B2 * | 9/2019 | Harsha | G06Q 30/0201 |
| 2013/0179246 A1 * | 7/2013 | Ross | G06Q 30/0207 705/14.24 |
| 2014/0095302 A1 * | 4/2014 | Monteverde | G06Q 30/0261 705/14.47 |
| 2015/0163629 A1 * | 6/2015 | Cheung | G06Q 30/0205 455/456.1 |
| 2016/0350787 A1 * | 12/2016 | Taylor | G06Q 30/0223 |
| 2017/0228744 A1 * | 8/2017 | Booth | G06Q 30/0201 |
| 2018/0308051 A1 * | 10/2018 | Nemati | G06Q 10/08345 |
| 2019/0050952 A1 * | 2/2019 | Goldberg | G08G 1/096833 |
| 2019/0392501 A1 * | 12/2019 | Kumaresan Nair | G06Q 30/02 |
| 2020/0005225 A1 * | 1/2020 | Chaubard | H04N 5/2253 |
| 2020/0019922 A1 * | 1/2020 | Harsha | G06Q 10/087 |
| 2020/0175467 A1 * | 6/2020 | Goldberg | A23L 5/10 |

OTHER PUBLICATIONS

Xu, Mengwen, et al. "Store location selection via mining search query logs of baidu maps." arXiv preprint arXiv: 1606.03662 (2016) (Year: 2016).*

Dillon, A. (2003) User Interface Design. MacMillan Encyclopedia of Cognitive Science, vol. 4, London: MacMillan, 453-458.

* cited by examiner

*Primary Examiner* — Patricia H Munson
*Assistant Examiner* — Marjorie Pujols-Cruz
(74) *Attorney, Agent, or Firm* — Knobbe, Martens, Olson & Bear, LLP

(57) ABSTRACT

Systems and methods are provided for using information obtained from a various databases to efficiently identify new or additional geographic locations in which a user, such as a seller, a manufacturer, a distributor, etc. can offer its goods and/or services for acquisition. A user interface is provided that provides information on such locations and value details for a user to utilize in determining where to offer or list an item for acquisition.

22 Claims, 14 Drawing Sheets

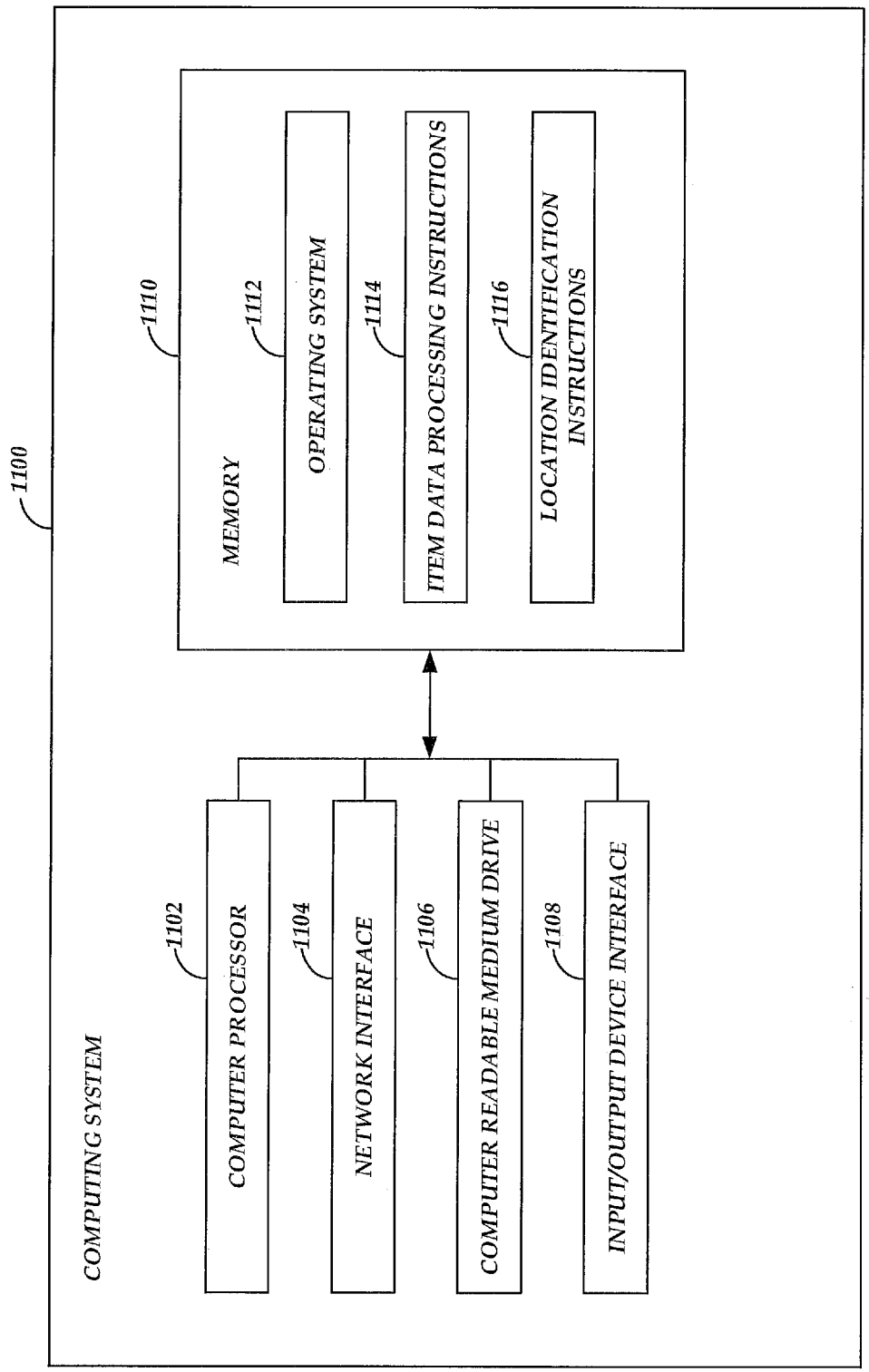

SYSTEMS AND METHODS FOR DEFINING CANDIDATE AND TARGET LOCATIONS BASED ON ITEMS AND USER ATTRIBUTES

BACKGROUND

Computing systems can be used to store, process, and/or exchange information in various ways. In an example application, a computing system may determine the geographic location or locations in which a particular item is sold. For example, it may be desirable to determine a location in which a particular item is sold in order to determine shipping time estimates or costs, tax estimates, locally-available offers, or the like. It may also be desirable to determine a respective demand for a particular item across various different locations.

In some scenarios, a database may store records regarding transactions, such as sales transactions, in a particular location or locations. For example, a database may store, for a particular location such as a governmental jurisdiction, country or state, a list of items available within the location and historical data and statistics associated with one or more items within the location.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 11 is a block diagram of an illustrative computing device configured to implement location identification and item processing according to some embodiments.

DETAILED DESCRIPTION

Introduction

Figure 1A:
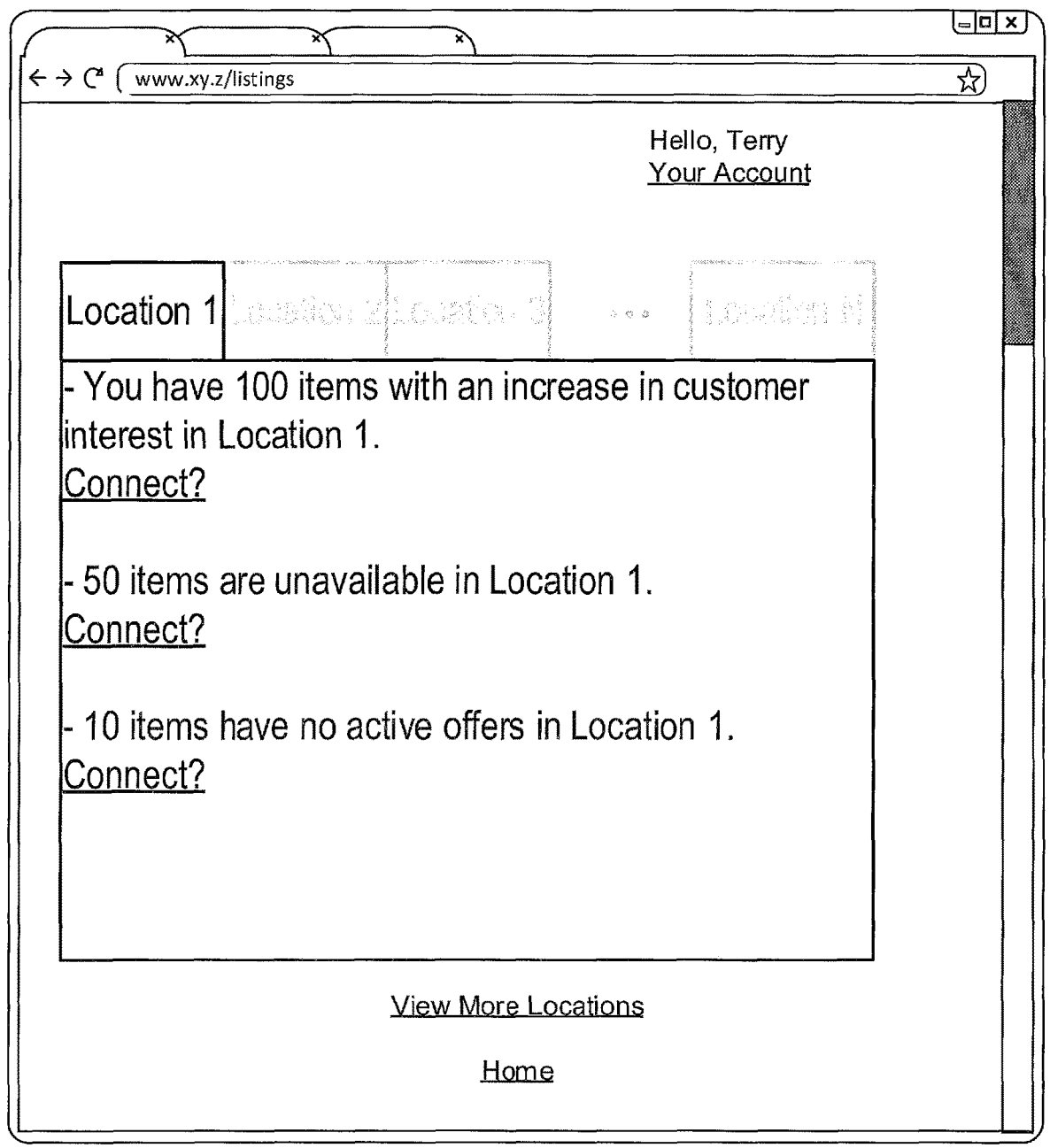
FIGS. 1A and 1B are illustrative examples of a user interface according to some embodiments as disclosed herein.

The systems, methods, and devices described herein each have several aspects, no single one of which is solely responsible for its desirable attributes. Without limiting the scope of this disclosure, several non-limiting features will now be discussed briefly.

The present disclosure is directed to a method and system that use database structure and machine learning to efficiently identify new or additional geographic locations in which a user (e.g., a seller, a user, a manufacturer, a distributor, etc.) of an item (e.g., a service or a digital or physical good) may offer the item for acquisition (e.g., purchase, lease, rent, given, exchange, etc.). A new or additional geographic location may be associated with an electronic marketplace that operates within the geographic location. An electronic marketplace may be a collection of computing devices administered to support interactions between multiple users and customers to offer and acquire items. As such, the electronic marketplace may have a particular domain name that references or otherwise identifies the geographic location in which it operates. For example, in cases where a geographic location in which an electronic marketplace is operated is a country, sovereign state, or dependent territory identified by a country code, the domain of the electronic marketplace is a country code top-level domain ("ccTLD"), such as ".de" or ".mx." In other embodiments, where a geographic location in which an electronic marketplace operates covers multiple jurisdictions, the domain of the electronic marketplace is a generic top-level domain ("gTLD"), such as ".com," ".net" or ".org." In yet other embodiments, where the geographic location in which an electronic marketplace is operated is a smaller jurisdiction, e.g., a state or province of a larger country, the domain of the electronic marketplace is a second- or third-level domain ("2LD" or "3LD"), such as "alberta.ca." For purposes of the present disclosure, generic, top-level, second-level and third-level domains will be referred to interchangeably herein as "domains" unless specifically stated otherwise. In addition, geographic locations such as countries, states, provinces, cities, municipalities, neighborhoods, etc., and the electronic marketplaces associated with those geographic locations, will be referred to herein as "locations" for sake of brevity. In accordance with the present disclosure, a user currently offering an item in a first location with a ".com" or ".us" domain, may benefit from offering the item in another locations with a ".de" domain. However, identifying which other locations may be suitable for offering the user's items, determining how to offer the user's items in such locations, and communicating such information to the user may be difficult and computationally expensive given the volume and distribution of the electronic data underlying such tasks across multiple databases. The described method and system addresses these technical problems by predicting a success rate for a user's item in another location. The success rate may be predicted based on, inter alia, location information, pricing information, and options for mitigating issues associated with conducting transactions for the item in the location.

Information regarding the predicted success rate, the new location, the electronic marketplace associated with the new location, and offering the item in the new location via the electronic marketplace may be displayed to the user in a relatively effortless manner via one or more user interfaces. The user interface may for example display for a user a group of new locations where the user, based on the machine learning ("ML") modeling and other calculations as discussed herein, is expected to have success with an item in one or more new locations. The system will also take into account information about the user to determine whether certain locations should be hidden from view or deprioritized (e.g., if a user has never interacted with more than one location in the time the user has been active or if a user's account is newly created and thus, less likely to have interest in other locations at a certain point in time). The expectation of success may be based on performance information about the item itself in that location, based on information about items comparable/similar to the item in that location, or both. The user interface may display options for entering or connecting to a particular location, such that a user, once understanding details regarding a location as it relates to the user's item as displayed on the user interface, may then signal interest in entering the location and proceed to entering the location. Accordingly, based on the ML modeling and other calculations as discussed herein, a value-rule parameter user interface may be presented to the user with respect to each locations or a subset of the locations that the user has signaled interest in. The value-rule parameter user interface may solicit information from the user or prompt the user for information regarding, for instance, a percent profit that the user would like to realize for an item.

Based on this information and based on historical and statistical information about one or more items in each location of interest, the user may be presented with additional information regarding options for optimally positioning the item (e.g., attributing a certain value to the item, translating the item description into a different language, etc.). The user may then act on this information within the user interface to identify a value for the item. In addition, a user interface may be provided that provides information to a user regarding potential obstacles to entering a location, such as low stock in the user's source inventory, and providing options for mitigating those obstacles. A user may thereby avoid potential issue with stock shortages, gating issues, etc. in connecting to a new location with minimal effort. Lastly, a user may be presented with information regarding opportunities in a location with respect to other items in a user's inventory with respect to that location. A user may then connect to the location with the other items as well and be provided with additional information from there to, again, optimally position the item to further meet the user's expectations with employing these systems and methods.

As used herein, the term "item," in addition to having its ordinary meaning, is used interchangeably to refer to an item itself (e.g., a particular good or service) and to its description or representation in a computer system, electronic catalog or other item information database. For example, an item can represent an entity such as a physical object, a parcel of land or other real property, a market instrument, a policy or contract, or other noun. Each item may be associated with a unique identifier that uniquely identifies the data item. The item's attributes (e.g., metadata about the object) may be represented in one or more properties. Attributes may include, for example, a geographic location associated with the item, a value associated with the item, a probability associated with the item, an event associated with the item, and so forth. As will be apparent from the context in which it is used, the term may also sometimes be used herein to refer only to the item itself or only to its representation in a computer system.

As used herein, a "database" refers to any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values ("CSV") files, eXtendible markup language ("XML") files, TeXT ("TXT") files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Although aspects of some embodiments described in the disclosure will focus, for the purpose of illustration, on particular examples of data structures, location specification, location identification algorithms, value identification algorithms and applications thereof, the examples are illustrative only and are not intended to be limiting. In some embodiments, the systems and techniques described herein may be applied to other types of data structures, other types of location specification, or other location or value identification algorithms. Various aspects of the disclosure will now be described with regard to certain examples and embodiments, which are intended to illustrate but not limit the disclosure.

Overview of a Location-Computing System

Reference will now be made in detail to example embodiments, the examples of which are illustrated in the accompanying drawings. Whenever possible, the same reference numbers will be used throughout the drawings to refer to the same or like parts. Disclosed herein are various systems and methods for generating a user interface for providing information to a user including information and item information. The systems and methods allow a user to gain access to information regarding an item and location. The system may be implemented using a graphical user interface ("GUI") that displays the information in a user-ready format.

For example, a user may be interested in identifying and optimizing certain variables associated with selecting a location in which to offer an item (e.g., which location and at what price) and conduct transactions for the item, such as a sale transaction. A user may want to introduce an item or group of items to a location. The user may wish to understand what modifications can be made to a current offer within a given location to achieve an increased level of awareness for the item in that location and thereby optimize the item's potential. The user, however, may not be able to correctly or efficiently identify which locations are best suited for a particular item or how those variables should be considered when determining how an item should be portrayed in a certain location to achieve that level of awareness. Moreover, a user may not have access to historical or statistical information regarding items in other locations that could inform a user's decision regarding which location the user should focus their attention on and how best to portray the item in the location for maximum item awareness.

Figure 1B:
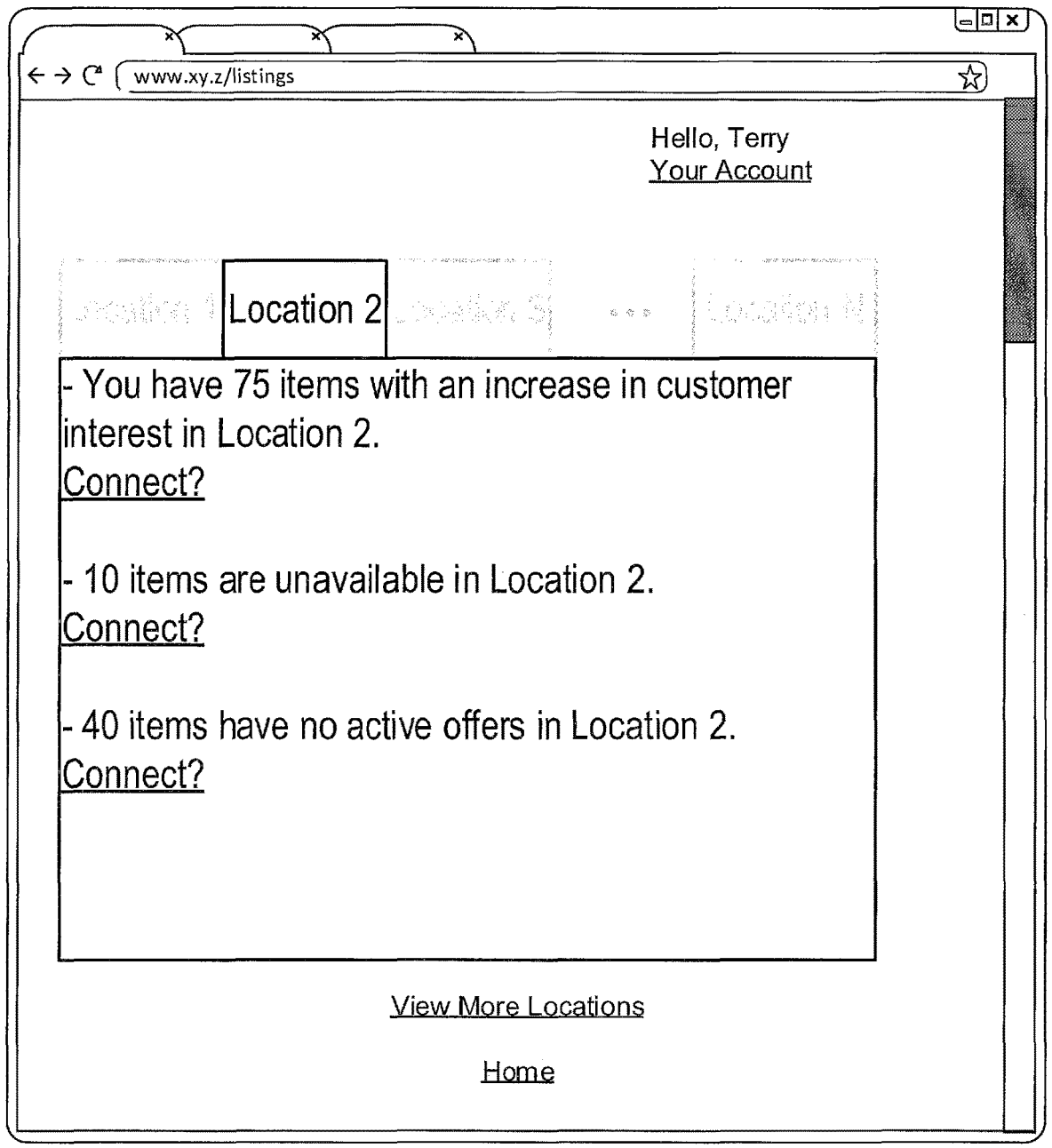

FIGS. 1A and 1B show illustrative examples of a user interface according to certain embodiments of the disclosure herein. In some embodiments, the user interface may include a number of different tabs associated with different locations (e.g., Location 1, Location 2, Location 3, Location N, etc.), each location being a new or additional location in which the user may offer its items for sale or other acquisition. As noted above, a location may be a country, region, state, venue, etc. associated with an electronic marketplace having a domain. In an embodiment, a tab can be selected by a user to view information regarding one or more items that user may be able to offer in a location. For example, FIG. 1A shows a view of information regarding items the user may be able to offer in Location 1 and FIG. 1B shows a view of information regarding items the user may be able to offer in Location 2. The item information for each location may be listed on a single page or across multiple different pages. In addition, each location may have sub-locations within that location (e.g., states or regions within a country or continent) where information might pertain to the location, a sub-location, or both. For example, separate tabs may be provided for sub-locations as part of a tab for another location such that a user may drill down through layers of locations within a user interface. In the example of FIGS. 1A and 1B, a location shown may represent a target location identified by the system and recommended to the user as a new or additional location in which to offer items, as will be further described below.

On each tab, a user may be presented with information on how many of the user's items have a high customer interest or demand in a target location, how many of the user's items are unavailable in the target location, how many of the user's items currently have no active offers in the target location, etc. For example, if an item is not available in a certain target location (e.g., if no offers for the item are listed in the target location by any sellers), it may be an indication that the item will perform well in the target location. Accordingly, an option to "Connect" or synchronize with the target location may be provided. In the illustrated embodiment, the "Connect" option is implemented as a hyperlink, selection of which by a user will initiate display of another user interface (described below with respect to FIGS. 7, 9 and 10) that provides additional information and tools to assist the user in listing items in the location. For example, in FIG. 1A, selecting "Connect" in connection with the "100 items with an increase in customer interest in Location 1" will initiate display of another user interface that provides additional information and tools to assist the user in determining which of its 100 items with increased customer interest to offer in the Location 1. An example user interface that may be displayed is as described in connection with FIG. 7 where a user may provide information to generate a value rule. Similarly, selecting "Connect" in connection with the "50 items [that] are unavailable in Location 1" will initiate display of a user interface that provides additional information and tools to assist the user in determining which of its 50 items to offer in Location 1, and so forth. In some embodiments, the 50 items unavailable in FIG. 1A may be a subset of the 100 items with an increase in customer interest and the 10 items with no active offers may be a subset of the preceding 50 items or the 100 items. For purposes of brevity, selecting "Connect" to initiate display of another user interface that provides additional information and tools to assist the user in determining which items to offer in a target location will generally be referred to herein as "connecting" to the target location. "Connecting" to a location generally refers to a user availing themselves of the rules, procedures and/or jurisdiction of a specific location for the purpose of exposing an item in a public, private or semi-private forum within that location.

A person of skilled in the art will understand that these options may be presented in a number of different ways while remaining true to the spirit of this disclosure. In addition, these are only examples of information that may be provided via a user interface and other options may be provided that convey information regarding why a user should consider offering an item in a new or additional location.

In the example of FIGS. 1A and 1B, an indication that there are items having an increase in customer interest is intended to inform a user that there are items within their inventory that may have high demand, and thus, may perform well, in a target location. These items may be unique or non-unique where the number of items comprises the sum of all unique and non-unique items. Alternatively, item numbers associated with the unique items or the non-unique items may be included separately. A "unique item" is one in which no data record is associated with the item or an identifier for the item in a database and a "non-unique item" is an item with an identification number (e.g., a serial number, tag number, etc.) that corresponds with a pre-existing data record in a database.

In the example of FIGS. 1A and 1B, an indication that a certain number of items are unavailable in a target location is intended to inform a user that there are unique items available in their inventory which no other user is currently offering in the target location. The system may also factor in information such as legal or compliance related issues that could preclude a user from offering an item in a target location. Thus, the user can select the option to connect to that target location in order to offer the unique item.

In the example of FIGS. 1A and 1B, an indication that there are no active offers in a target location is intended to inform a user that there are non-unique items available in their inventory which are also present in the target location, but there are not active offers currently, which means that those items are not currently being sold by another user in that location. Thus, the user will be provided with the option to connect to that target location in order to make those offers active again.

A person skilled in the art will understand that the example illustration and the examples described above for the user interface in FIGS. 1A and 1B is merely an example depiction of a potential user interface. The user interface may be designed in a number of different ways while providing a similar degree of information and functionality.

Network Computing Environment

Figure 2:
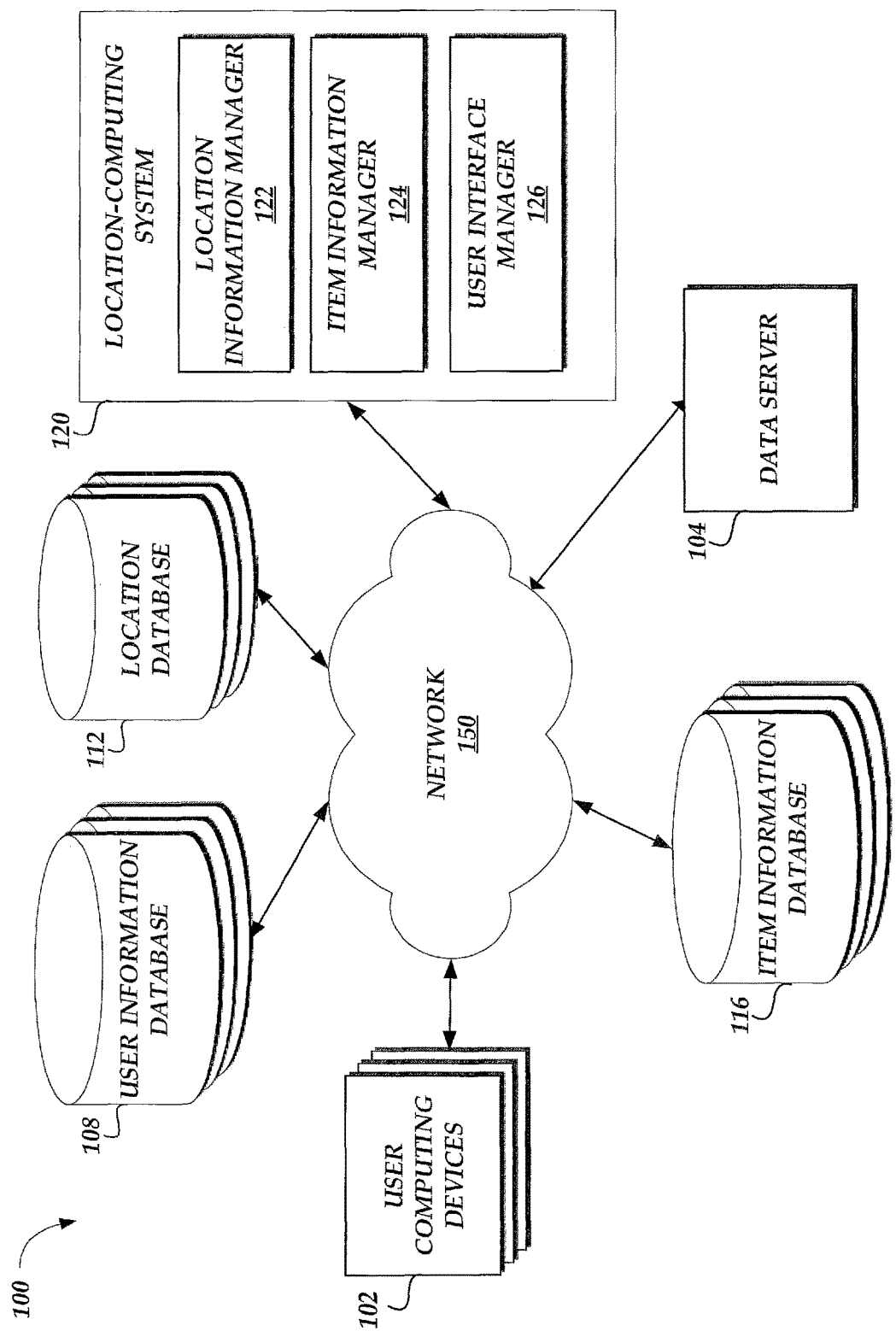
FIG. 2 is a block diagram showing various aspects of a location computing-system, with various databases, in a network environment in which the location-computing system, with a location information manager, item information manager, and user interface manager, may be implemented, according to various embodiments of the present disclosure.

FIG. 2 shows a computing environment 100 in which aspects of the present disclosure may be implemented. As shown, the computing environment may include user computing devices 102, a user information database 108, a location database 112, an item information database 116 and a location-computing system 120. The user computing devices 102, user information database 108, location database 112, item information database 116, and location-computing system 120 may communicate with each other via one or more communication networks 106. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, peer-to-peer network, etc. or a combination thereof, some or all of which may or may not have access to and/or from the Internet.

Data server 104 may be implemented to facilitate the flow of information from various databases, managers, and devices. Data server may be implemented as part of location-computing system 120 or may be a separate server device with authorization to access and manipulate the various different database items and managers within location-computing system 120. For example, data server 104 may be responsible for employing or maintaining the machine learning techniques described herein.

The location-computing system 120 may include various components for providing the features described herein. Illustratively, the location-computing system 120 may include a location information manager 122 for managing location information, an item information manager 124 for managing item information, and a user interface manager 126 for managing user interface information. The components of the location-computing system 100 shown in FIG. 1 and described herein are illustrative only, and are not intended to be limiting. In some embodiments, fewer, additional, and/or alternative components may be implemented by the location-computing system 100. In some embodiments, the various databases may be or include a key-value data store, such as a "noSQL" database, object-based database, or dictionary.

The location-computing system 120 and/or data server 104 may be implemented on one or more physical server computing devices that provide computing services and resources. In some embodiments, the location-computing system 120, data server 104, or individual components thereof may be implemented on one or more host devices, such as blade servers, midrange computing devices, mainframe computers, desktop computers, or any other computing device configured to provide computing services and resources. For example, a single host device may execute one or more instances of a location-computing system 120 (or individual components thereof). A computing environment, such as a network computing provider, may include any number of such hosts.

In some embodiments, the features and services provided by the location computing system 120 and/or data server 104 may be implemented as web services consumable via the communication network 150. In further embodiments, the location-computing system 100, data server 120, or individual components thereof are provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

The user computing devices 102 may be any device capable of network access, such as a phone, laptop, desktop computer, tablet, etc. In addition, user computing devices 102 may have the ability to provide a user interface or graphical user interface to a user, for example, via a touch enabled display. Each user computing device 102 may be associated with a dedicated user or group of users interested in interacting with the location-computing system 120, such as a seller, merchant, user, trader, retailer, company, distributor, manufacturer, etc.

Information regarding users may be stored in a user information database 108. For example, a user information database 108 may include personal information, user preferences, statistical and/or historical data for users, IP addresses, a user's physical coordinates as indicated by GPS, IP address data, etc., a headquarters or place of residency, locations a user has or is currently engaged (e.g., connected) with, or a user's likelihood or propensity to diversify when listing an item with respect to location entries. The likelihood or propensity for a user to entertain different location options when presented with more than one location option may be calculated by location information manager 122 based on the statistical and/or historical data contained in an appropriate database of the network environment. This may be stored in a database as a binary value or alternatively, as a spectrum of values as person skilled in the art would understand.

Information regarding a user's propensity to expand to new locations may be used to identify one or more candidate locations. The candidate locations are locations with which a user may be interested in entering or engaging, for example, to offer an item for sale or other acquisition. Whether a candidate location can be then elevated to status of a "target location" is subject to further analysis to determine which candidate locations would actually be worth the expansion based on results of a multi-tiered analysis as described herein.

Determining Target Locations by Calculating Demand

In one illustrative embodiment, the location-computing system 120 may receive information regarding an item from a user computing device 102. Item information manager 124 may then analyze the item information received and extract certain attributes from the item information. Item information manager 124 may also store the information accordingly in item information database 116. In some embodiments, information from item information database 116 may be used to supplement item information provided by a user. For example, item information database 116 may be used to auto-populate a dropdown menu of options for a user as the user inputs item information via the user interface.

Item information database 116 may include data regarding items that have been described or listed by users of the system over time. For example, item information database 116 may include all items that have been listed for sale, all items that have been sold, how much each item has sold for and/or an average cost associated with an item, the amount of time an item was listed in a marketplace or venue before being either purchased or removed from the listing, and any other information associated with an item. Information such as brand name, manufacturer, model, color, unique identification numbers (e.g., International Standard Book Numbers ("ISBNs"), serial numbers, etc.), item description, product title, keywords, product condition, etc., may also be included. In some embodiments, item information database 116 may include performance data for an item or group of items (e.g., sales data) and desirability data as indicated by user selection that an item is of interest but for purchase at a later time or by another user. For example, a user may add the item to a bucket or list to indicate that the item is of interest. The number of times an item is added to such a bucket or list may be tracked in item information database 116.

In addition, item information manager 124 is configured to determine items within item information database 116 or elsewhere that are similar or comparable to the item based at least in part on the item information provided by the user. For example, item information manager 124 may extract attributes of the item, characterize the item, and identify similar/comparable items or similar offers. In some embodiments, comparable items are only identified for unique items. Information for the comparable items may be stored and found in item information database 116. A ML model may be deployed to identify these similar items based on initial item information.

The trained ML model can be used to determine data representing the likelihood that two items are comparable or similar. For example, a support vector machine ("SVM") can be used to determine whether two items are comparable.

For brevity, these aspects may not be described with respect to each possible ML model that may be used. In practice, however, many or all of the aspects of the disclosure may apply to other ML models, including but not limited to those described herein. Examples of ML models that may be used with aspects of this disclosure include classifiers and non-classification ML models, artificial neural networks ("NNs"), linear regression models, logistic regression models, decision trees, support vector machines, Naïve or a non-Nave Bayes network, k-nearest neighbors ("KNN") models, k-means models, clustering models, random forest models, or any combination thereof. For example, certain aspects of the disclosure will be described using events or behaviors (such as clicking, viewing, or watching) with respect to items (e.g., products, videos, songs, etc.), for purposes of illustration only. For brevity, these aspects may not be described with respect to events or behaviors regarding objects (e.g., data objects, such as search strings).

Location information manager 122 may then identify candidate locations from location database 112. The candidate locations may be a subset of all locations possible within a set or within location database 112. Candidate locations may be based on the subset of locations where an item or comparable item is present. Candidate locations may also be a reduced subset of possible locations where the ML model has determined a user is likely to enter. This determination may be based at least in part on a user's past behavior, relative length of time that user has been active in a current location, the degree of which a user has listed or sold items in the past, etc.

Item information manager 124 may then determine in which candidate locations the item is predicted to be a high performer to determine a set of target locations. For example, item information manager 124 may employ an arbitrary performance or demand threshold to determine whether the item or a comparable item is in high demand in a candidate location.

In a non-limiting example, the threshold may be measured against the sales data for an item in one or more candidate locations. The sales data may be an average weighted sales metric, such as revenue or gross merchandise sales ("GMS"). Revenue may be in terms of daily total GMS, net revenue, or some other data useful in identifying the revenue generated by an item. In another non-limiting example, the threshold may be measured against the sales data for an item according to the records for one or more candidate locations multiplied by the number of times a user has added the item to the bucket or list that indicates that the item is of interest as previously described. The threshold may be adjusted by the machine learning model over time. In addition, the sales and bucket data obtained for a predetermined number of days may be used to train the ML model.

Furthermore, different algorithms may be employed depending on the type of product or whether the product is determined to be a unique item or non-unique item in a certain location. For example, a calculation for a non-unique item may be based on whether the item has been viewed by a potential customer (e.g., a viewership value) over a certain number of times (e.g., a viewership threshold), and over a predetermined number of days (e.g., predetermined timeframe), where the predetermined number may be a positive predetermined constant. In another non-limiting example, the threshold could be based on the number of times an item has been added to the interest bucket during a predetermined period of time. In a non-limiting example, the value for the number of times an item is viewed could vary based on the item category (e.g., furniture vs. clothing) for the item, whereas the value for the number of times added to the interest bucket may be a positive predetermined constant.

If the calculation results in a value exceeding the threshold value, the item may be considered in high demand or high performing in the candidate location and the location status can then be elevated to that of a target location. Otherwise, the item is identified as being in low demand and that location is removed from the pool of candidate locations. Ultimately, the inputs described above will be used to train the ML model to determine whether a given item is a high demand item or not in a given location. ML Model training may happen on a daily, hourly or substantially continual basis.

Value-Rule Parameters

These results may then be presented to a user in a user interface as shown in the example of FIGS. 1A and 1B. Once a user decides that they would like to enter or connect to a target location with respect to an item that has been indicated to be in high demand in the target location, the user may then be presented with information regarding preferred methods of presenting item information in the target location for potential customers to view.

Figure 8:
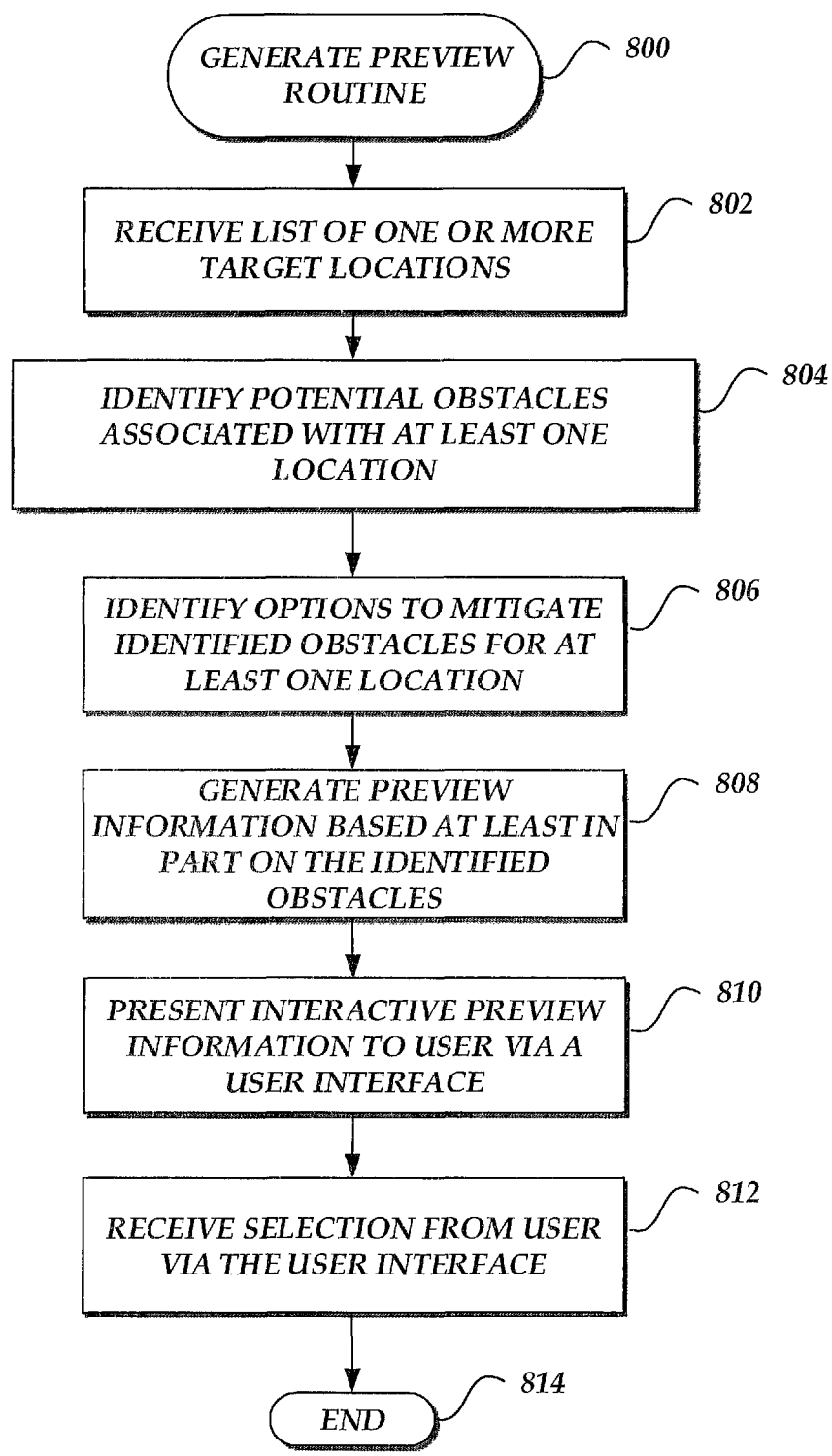
FIG. 8 is an illustrative flow diagram showing an example routine for generating a user interface according to some embodiments.

In some embodiments, a value (e.g., price) proposal may be generated based on the ML model to determine, based on a number of different factors, what information should be provided in a user interface displayed to a user, for example, after the user has designated, for connection, one or more target locations in the user interface of FIGS. 1A and 1B. The value proposal may be in the form of a user interface soliciting information from the user regarding value rule parameters, such as how much the item normally sells for or a desired profit margin. The factors involved in calculating the value proposal may include sales tax in a particular location, shipping costs from a source location, conversion rates for currency, the average cost of the item in the location, etc. Alternatively, a user may be presented with pre-filled best fit value rule options. A ML model may then generate value proposals based on information received from the user in conjunction with information retrieved from the appropriate database regarding current items in the target location or comparable items in the target location. Thus, a user's effort in deciding a value rule for each item will be greatly reduced. An example presentation of a user interface is shown in FIG. 8 which is described in more detail below.

Figure 7:
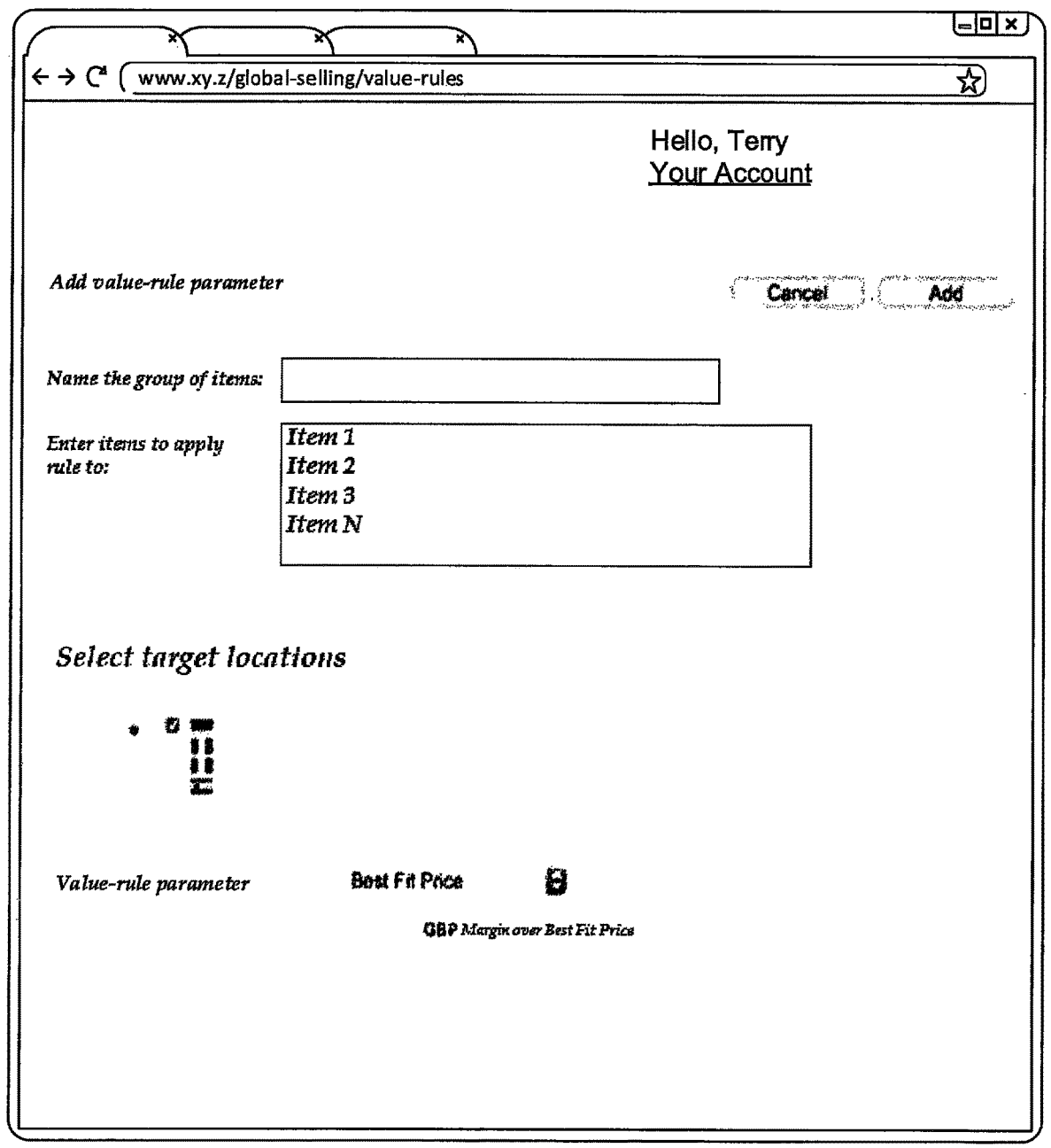
FIG. 7 is an illustrative example of a user interface that allows a user to specify value rules for an item based on a target location according to some embodiments.
Figure 9A:
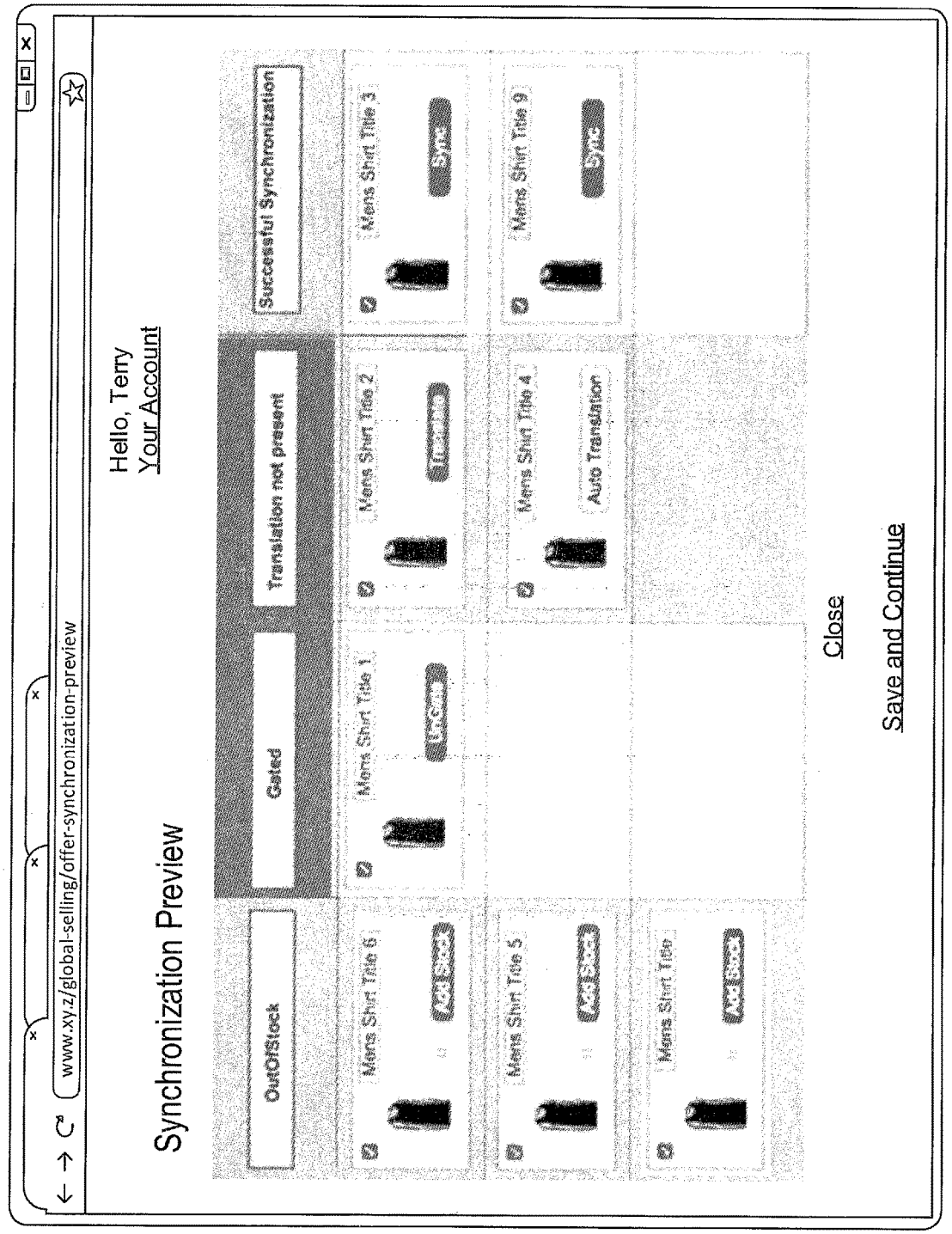
FIGS. 9A and 9B is an illustrative example of a user interface that allows a user to mitigate issues identified for synchronizing with a location according to some embodiments.
Figure 9B:
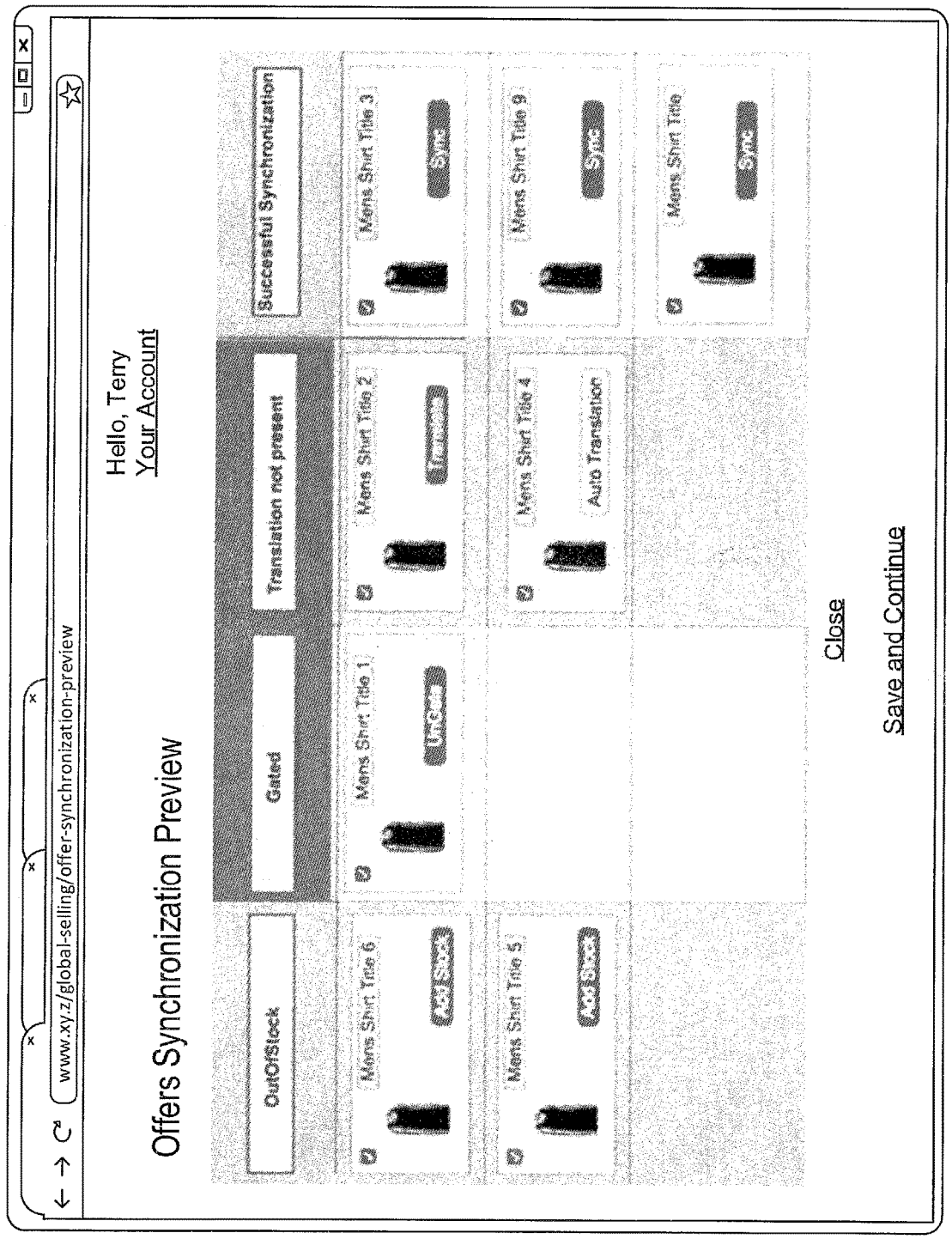

In some embodiments, a hyperlink may be provided in the user interface as shown in FIG. 7 that allows a user to preview details regarding a connection while pending such as the illustrative embodiment shown in FIGS. 9A and 9B. In other embodiments, a preview interface as in FIGS. 9A and 9B may be displayed automatically as target locations are selected, for example, as shown in FIG. 7.

In some embodiments, a value rule provided may be in the form of a best fit value rule which a user can use to determine how best to value an item based on information available to the system. The user interface, for example, as shown in FIG. 8, may provide an option for a user to specify a positive or negative margin for a potential listing. The margin information may be used in addition to a calculated best fit value for an item that has been determined for a location or across multiple locations. Other value-rule parameters may be available to a user as will be understood by a person of skill in the art.

For example, in order to calculate an estimated product price ("EPP") based on a value-rule parameter identified by a user, a target product price ("TPP") is first identified. TPP may be the price at a source location plus additional factors (e.g., shipping, import/export costs, etc.) plus the value rule amount. The value rule amount may be based on the margin specified by a user. This calculated sum can then be multiplied by the currency exchange rate for a given location to arrive at the TPP. In a non-limiting example, if the TPP is greater than or equal to a historical/statistical item price (e.g., average, maximum, minimum, etc.) in the location based on information from item information database 116 and/or location database 112, then the EPP can be equal to the TPP. If the TPP is less than the historical item value, the EPP may be adjusted in order for a user to remain competitive and in sync with product prices in a target location. For example, the EPP may be adjusted to be equal to, for example, the historical/statistical item price minus the number of units listed in the target location within a certain product range. A look-up table may be employed for determining the number of units to subtract ("C"). For example, if the product is within a price range of $1-$10, the number may be zero, whereas if the price range is within a price range of $10-$50, then the number subtracted may be one, etc. Ultimately, this rule is dynamic and may continuously update the value associated with a product in a location when, for example, any of the above-defined parameters for calculating EPP change. In a non-limiting example, reevaluation of an item value may be necessary where a currency exchange rate changes by a certain amount or percentage or if there is a change in the historical/statistical item value in a target location. In another example, a pricing rule may be in terms of a percentage over the normal listing price in a source location (e.g., 30% above price in source location).

In a non-limiting example, if a user is located in the United States and is presented with a target location for Canada based on information obtained on an item with a current sale price of $10 in the United States, a user may specify that they are interested in a $5 profit margin at least. Thus, if the currency exchange rate from U.S. dollars to Canadian dollars is 0.78, then the calculation of EPP will be as follows: TPP=(10+5+shipping/export, etc.)*0.78=~11.7 Canadian dollars. If the historical/statistical price for the item in Canada is 15 Canadian dollars, then EPP will equal the historical/statistical price minus C since TPP is less than EPP.

Preview Selection

A user may be able to also receive a preview of certain information before and/or after defining value rule parameters and/or after selecting to connect to a target location. The preview may provide information as to reasons a connection request or synchronization may be problematic and provide possible remedies for alleviating the identified problems. In addition, a user may be able to select an option that proactively fixes an issue that would otherwise block a user's offer from synchronizing.

For example, issues may arise for items that are out of stock in a source location, an item description or offer is not available in the spoken language of the target locations, or the offer has "gating" issues. A user may be able to preview these status indicators before creating a connection to a target location in order to proactively take action to fix certain issues before proceeding further. This allows the user to ensure the item will list or synchronize successfully. An example preview page is shown in FIGS. 9A and 9B which will be described in more detail below.

Opportunities Identified in a Target Location

In some embodiments, after a user has connected to one or more locations with respect to one or more items, a user interface may present a list of opportunities and recommendations with respect to each location. The information may be with respect to GMS or the amount of GMS that may be generated based on for example, weekly GMS data regarding the item. In some embodiments, only the top opportunities that are determined to have the highest likelihood of increasing a user's sales will be shown. A user may select options listed on such an opportunities page in order to maximize the likelihood of having sales in the target location based on information available to the system. In other embodiments, the opportunities may be based on a determination that a listing needs to be translated into a different language or whether inventory needs to be replenished in either a target or source location. An example reason for providing only the top opportunities is so that, in the case where an item description needs a translation, a user can decide whether to pay for the translation based on the cost benefit analysis conducted by the location-computing system 126 and displayed via item information manager 124 and/or location information manager 122.

Figure 10A:
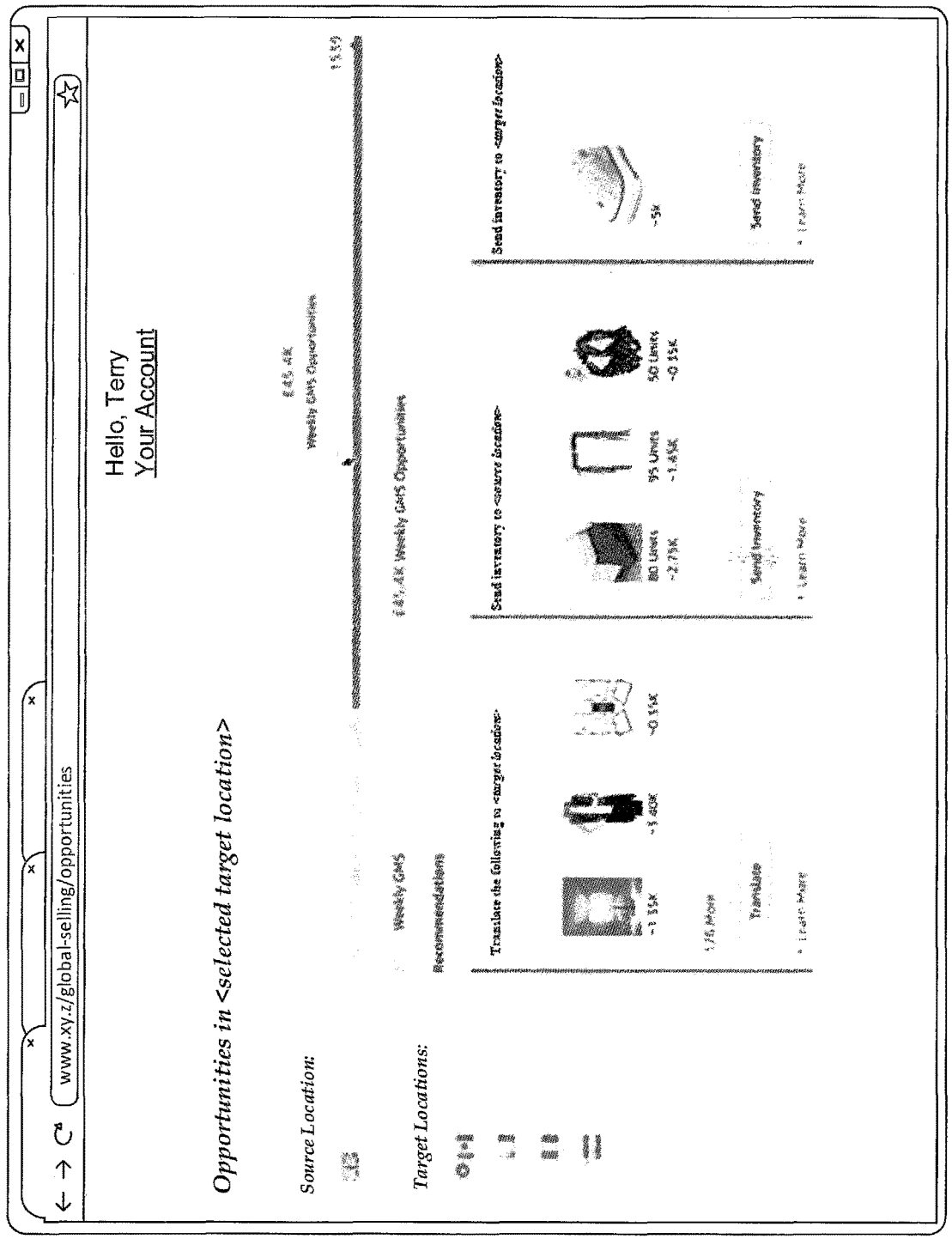
FIGS. 10A and 10B is an illustrative example of a user interface that allows a user to identify potentially advantageous options for maximizing potential of an item according to some embodiments.
Figure 10B:
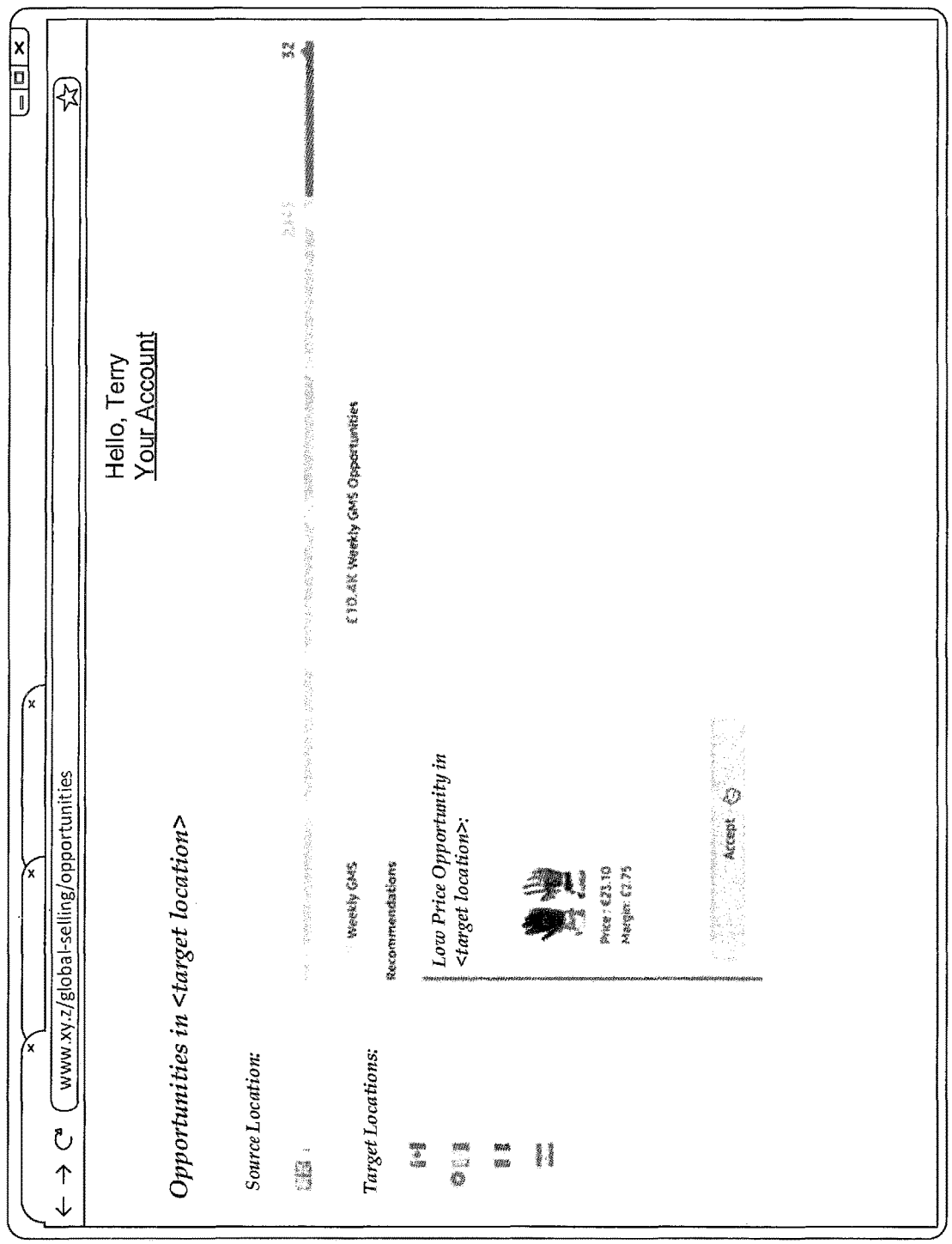

An example user interface is shown in FIGS. 10A and 10B, described in more detail below, which illustrates various different example opportunity options that a user may be presented with as generated by location-computing system 126 and displayed via user interface manager 126.

Example Process for Generating a User Interface

Figure 3:
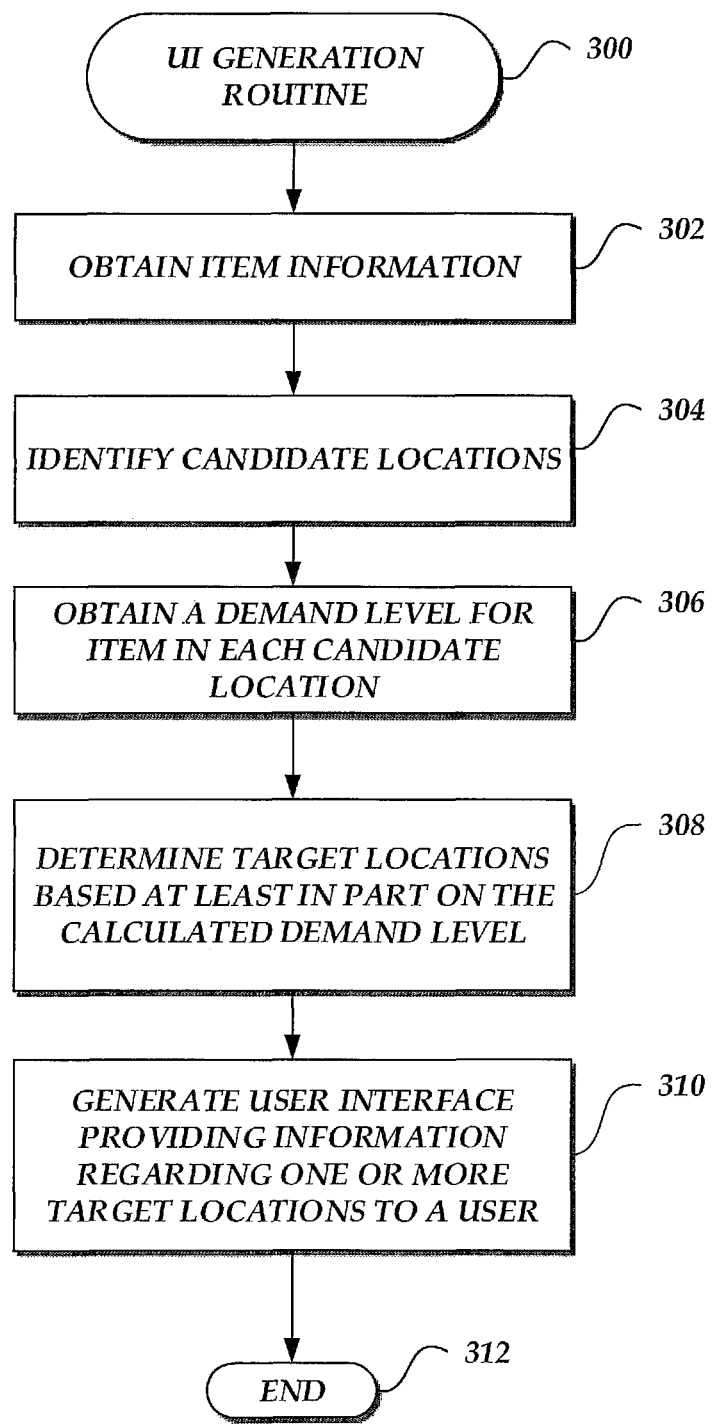
FIG. 3 is a flow diagram showing an example routine for generating a user interface according to some embodiments.

FIG. 3 is a flow diagram of an illustrative process 300 that may be executed by location-computing system 120 to generate a user interface ("UI") that intuitively provides information to a user for the user to act upon. The process 300 will be described in connection with example items, calculations and databases as shown in FIG. 2. However, the examples are for illustration only, and are not intended to be limiting. In some embodiments, the process 300 or portions thereof may be used in connection with different calculations or deploy different ML models and/or utilize different training parameters for training the ML model.

The process 300 shown in FIG. 3 begins at block 302. The process 300 may begin in response to an event, such as when initial item information is obtained or received or when a user first indicates an interest in listing an item in one or more locations. When the process 300 is initiated, a set of executable program instructions stored on one or more non-transitory computer-readable media (e.g., hard drive, flash memory, removable media, etc.) may be loaded into memory (e.g., random access memory or "RAM") of a computing device of the location-computing system 120. The executable instructions may then be executed by a hardware-based computer processor (e.g., a central processing unit or "CPU") of the computing device. In some embodiments, the process 300 or portions thereof may be implemented on multiple processors, serially or in parallel.

At block 302, a computing device, such as item information manager 124, data server 104 or some other component of the computing system 100, can receive or obtain information regarding an item. The item information may be obtained directly or indirectly from one or more user computing devices 102 or from data server 104. The item information may be obtained via network 150, for example, from a database storage device, from a user computing device 102, or from data server 104. For example, data server 104 may obtain information for one or more items directly or indirectly from a user computing device 102. In a non-limiting example, data server 104 may provide the item information to location-computing system 120 directly or over network 150. Alternatively, data server 104 may transmit the item information to item information database 116 for subsequent retrieval. In some embodiments, only a subset of the item information (e.g., certain aspects deemed pertinent to the functioning of the system) obtained from user computing device 102 may be transmitted to location-computing system 120 for processing.

The item information may include a representation of the item, such as an image, photograph or other rendering of the item, or product or service that conveys information about the item to the viewer. The item information may also, or alternatively, include a textual representation of the item. For example, an interested user may manually provide a textual product description. Alternatively, a textual product description may be generated by a ML model. For example, a ML model may generate text associated with an image of an item. In a non-limiting example, the item information may include information regarding a color, product type (e.g., clothing, sweater, etc.), status (e.g., new, used, etc.), an associated cost for the item (e.g., average price, maximum or minimum price, etc.), a brand name or manufacturer, model name, or any other information that conveys to a user an attribute of an item.

In some embodiments, the item information may be auto-populated by the location-computing system 120 based on preliminary, or partial, identification of the item. For example, a user may input a unique identifier for an item and the system may access a database containing item information, such as item information database 116, to identify additional information regarding the item associated with that identifier. In addition, information provided by a user may be supplemented by information contained in item information database 116. For example, a user may provide preliminary information such a model, manufacturer or name of a product and, based on information contained in a respective database, a ML model may determine that additional information should also be included, such as product type. In some embodiments, this determination is based on information that is useful in identifying comparable products in a general set of locations or in a specific location. Additionally, a pull-down menu or fillable fields may be used to obtain such information regarding an item.

At block 304, candidate locations may be identified for an item. The candidate location may be based on user information obtained from user information database 108 as will be further discussed below with respect to FIG. 4. In a similar manner as is described for obtaining item information at block 306, the candidate locations may be obtained from data server 104, from location database 112, derived from information regarding other users, or determined at location-computing system 120. For example, based on information about the user, information about similarly situated users may be used to determine candidate locations for the user. In a non-limiting example, a ML model may determine that a user is a novice user and based on information about other novice users, determine that the novice user is unlikely to sell in continents other than where the user is currently situated. In this example, the system may determine that the candidate locations include only those locations within a range in which the novice user has a propensity or likelihood to be interested.

At block 306, a demand value for the item may be obtained for each candidate location as discussed below with respect to FIG. 5. In a non-limiting example, the demand value may be calculated by location-computing system 120 using item information manager 124. The demand value may be calculated by a separate entity and the calculated demand value may be communicated to location-computing system 120 over the network. For example, the demand value for an item or group of items may be stored in item information database 116. In another example, the demand information may be stored in location database 112 in association with one or more locations to which the demand value pertains. Using data server 104 or by querying a database directly, location-computing system may obtain demand information for an item stored on the network (e.g., databases 112 and/or 116). If the requested demand information is unavailable, the location-computing system may be tasked with calculating the missing demand value for the item or a comparable item. In some embodiments, location-computing system may store the information in item information database 116, or in location database 112 if the demand is tied to a specific location. In some instances, demand information for a specific location may be derived from demand information for one or more other locations, for example, through use of a ML model.

At block 308, one or more target locations may be determined based on the calculated demand value. For example, if the demand value exceeds a certain threshold as described above, the item will be considered a high demand item in the candidate location. Based on the ML model employed, a candidate location may then be considered a target location based at least in part on the indication that the item is of high demand in the candidate location. For example, the ML model may employ a corrective model that is based on the relative similarities and/or differences between the user's item and the one or more comparable items used to calculate the demand value. Alternatively, the determination that a user's item is a high demand item in a location may be based on the determination that a comparable item is a high demand item in the location.

At block 310, a user interface may be generated by user interface manager 126 that provides information regarding the one or more target locations to the user. An example user interface may be seen in FIGS. 1A and 1B which shows an example of target locations being presented to a user for the user to act upon. For example, a user may select to connect to a target location which then may route the user to a new user interface that includes information identifying the one or more target locations selected for connection and provides an option for the user to initiate the offer for the item in the target location. Once the user chooses to initiate or accept the offer, the item may be automatically listed in the target location based on value information provided from the user or obtained from a separate data source. Alternatively, accepting the offer may route a user to another user interface that allows a user to specify value information. In some embodiments, selecting via the user interface to initiate an offer in a target location will automatically list an item in the target location for other users (e.g., buyers, customers, other merchants, etc.) in the target location to view the information regarding the item. In such embodiments, the item may be listed with a value based on a default or arbitrary value rule, for example, without input from the user, based on information obtained from other users and/or based on historical and statistical data regarding the item or comparable items in the target location.

Although the blocks of each flowchart are shown as ordered sets, the blocks comprising the flowchart may be reorganized so long as the desired function or logic of the system is maintained. As an example of this concept, the first two blocks of FIG. 1 (blocks 302 and 304) may be swapped such that block 304 is arranged above block 302 when viewed pictorially. In other words, identifying candidate locations and obtaining item information may be performed in any order or even simultaneously. This same concept, although not repeated for each block herein, applies equally for each flowchart and block described herein.

Example Process for Identifying a Candidate Location

Figure 4:
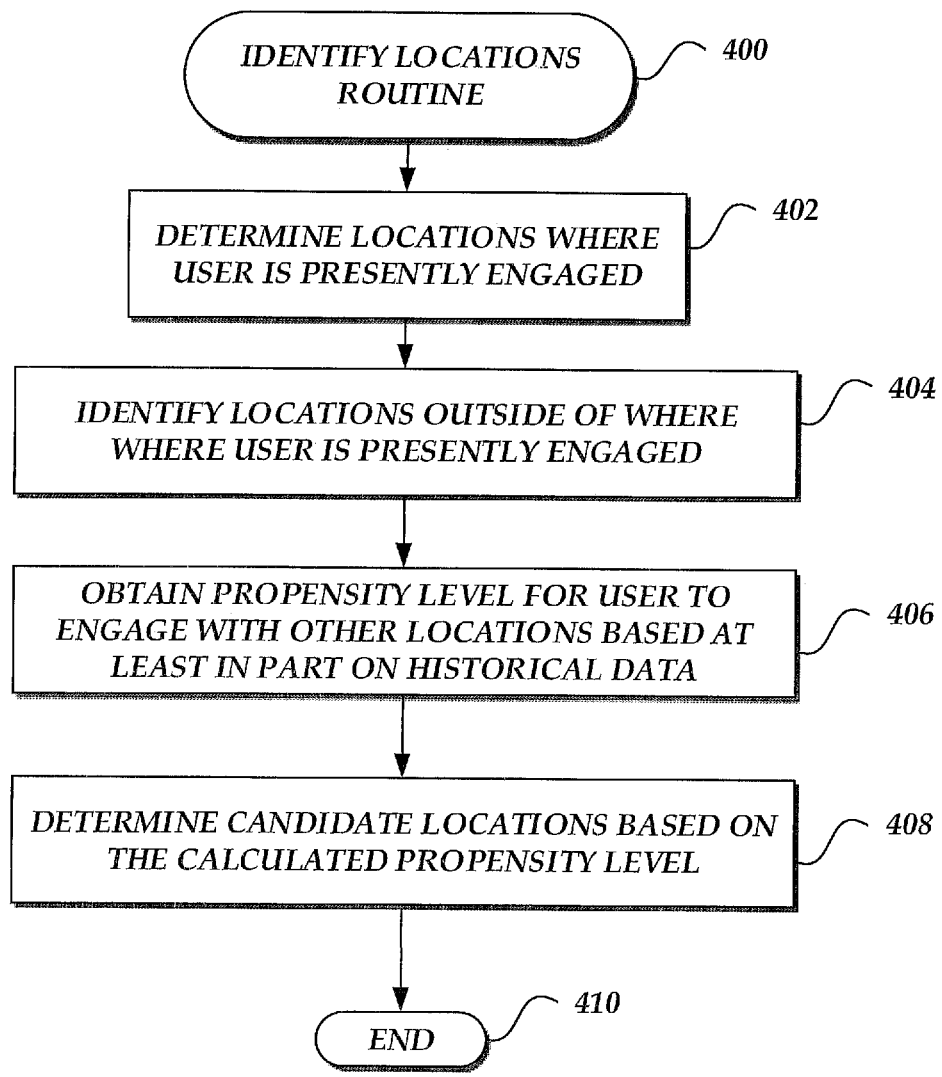
FIG. 4 is a flow diagram flow diagram showing an example routine for identifying candidate locations according to some embodiments.

FIG. 4 is a flow diagram of an illustrative process 400 that may be executed by a location information manager 122 to identify one or more candidate locations. The process 400 will be described in connection with example items, calculations and databases as shown in FIG. 2. However, the examples are for illustration only, and are not intended to be limiting. In some embodiments, the process 400 or portions thereof may be used in connection with different calculations or deploy different ML models and/or utilize different training parameters for training the ML model.

The process 400 shown in FIG. 4 begins at block 402. At block 402, a determination may be made as to which location(s) a user is presently engaged. At block 404, a determination may be made as to which location(s) in which a user is not presently engaged or in which a user has never been engaged. This determination will result in a separation of locations known to be of interest to a user and locations to where a user may be interested in expanding. At block 406, a calculated propensity level is obtained. In some embodiments, the propensity level indicates the likelihood of a user expanding into different locations with respect to their item. In other example embodiments, the propensity level indicates a user's likelihood to be interested in a certain geographic location, area or range based on a user's historical and/or statistical information. For example, a user may have a propensity to only list items within 100 miles of their home or store. In another example, the propensity level may be based on a characterization of the user and a propensity level for a user's counterpart in that counterpart's respective location. A person skilled in the art will understand that there are other ways of calculating a user's propensity level, such as those described above, that may achieve the desired function of the overall system.

At block 408, a list of candidate locations may be determined based on the calculated propensity level. These candidate locations are then used to determine target locations, for example, as described with respect to FIG. 3. In addition, the above steps may be with respect to a specific item, set of items, or type of item, such that the identification of candidate locations is item specific. In some embodiments, these determinations and calculations may be conducted by an ML model.

Example Process for Calculating Demand of an Item

Figure 5:
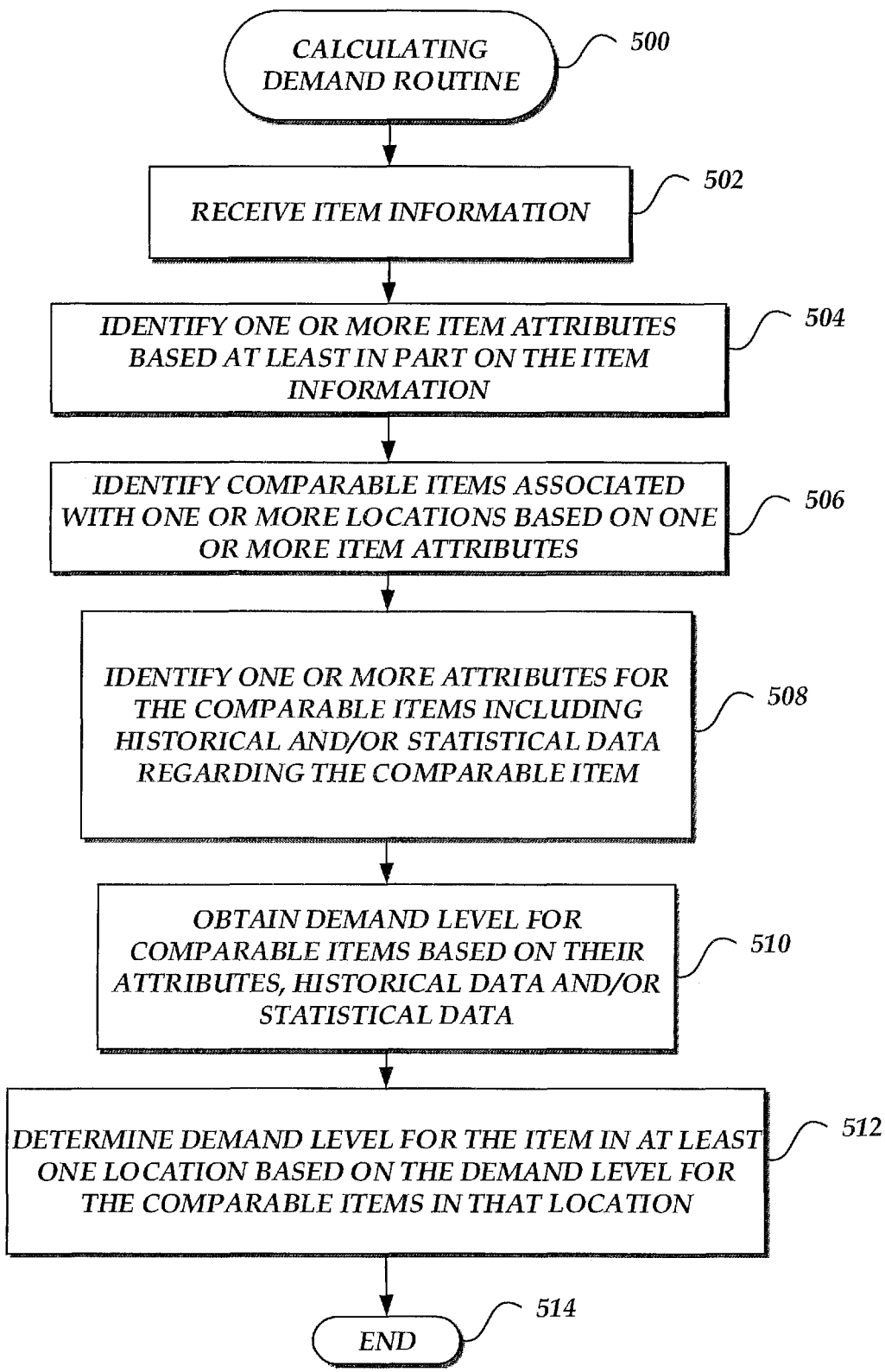
FIG. 5 is a flow diagram flow diagram showing an example routine for calculating the demand of an item according to some embodiments.

FIG. 5 is a flow diagram of an illustrative process 500 that may be executed by an item information manager 124 to calculate the demand value for one or more items in one or more locations. The process 500 will be described in connection with example items and calculations and databases as shown in FIG. 2. However, the examples are for illustration only, and are not intended to be limiting. In some embodiments, the process 500 or portions thereof may be used in connection with different calculations or deploy different ML models and/or utilize different parameters for training the ML model.

The process 500 shown in FIG. 5 begins at block 502. The process 500 may begin in response to an event, such as when a request is received to calculate a demand value for one or more items of interest in which the item may have transaction history associated with a particular geographic location or locations. When the process 500 is initiated, a set of executable program instructions stored on one or more non-transitory computer-readable media (e.g., hard drive, flash memory, removable media, etc.) may be loaded into memory (e.g., RAM) of a computing device of the location-computing system 120. The executable instructions may then be executed by a hardware-based computer processor (e.g., a CPU) of the computing device. In some embodiments, the process 500 or portions thereof may be implemented on multiple processors, serially or in parallel.

At block 502, a computing device, item information manager 124, data server 104 or some other component of the computing system 100 can receive or obtain information regarding an item according to methods disclosed above with respect to block 502.

At block 504, item attributes are identified based on the item information. Item attributes may be identified, sorted and filtered so that only the most useful item attributes are used for identifying similar or comparable items to the item based on the item information received at block 502. Item attributes may be a subset of the item information and may be a function of what inputs the respective ML model identifies as most relevant to finding the closest comparable items.

At block 506, comparable items to the initial item are identified. A similar or comparable item or items is an item or group of items that are the same as the item based on the item information or are related to the item. In an illustrative example, a comparable item for a couch may be the same couch but could also include a chair made by the same manufacturer or a similar couch made by a different manufacturer.

At block 508, information regarding the comparable items may be retrieved including historical and/or statistical data regarding the comparable item. For example, information may be related to historical GMS and sales information and a number of times within a certain timeframe that other users have indicated the comparable item was of interest within a location.

At block 510, a calculated demand value is obtained for the comparable items based on their attributes, historical data, statistical data, etc. The demand value may be measured against an arbitrary threshold to determine whether the comparable item is a high demand item in a specific location or not. In some embodiments, the threshold is based on historical and/or statistical data for the item or based on data for multiple items. For example, if the user's item is a cell phone, the threshold may be based on sales data for similar cell phones, cases, headphones, etc. In some embodiments, a ML model is deployed to analyze the comparable item information to determine whether it is a high demand item in the specific location or not. The ML model is capable of analyzing differences between the items and applying a corrective factor when determining how a threshold should be set or subsequently adjusted.

At block 512, a translation correlation may be applied for determining the demand value for the user's item based on the demand value calculated for the comparable item. In the case where the comparable item is not necessarily the same as the user's item (e.g., a couch and a chair), a ML model may be deployed to translate the demand value for the comparable item to that of the user's item before making the final determination that the user's item is also a high demand item. In some embodiments, whether an item is considered a high demand item in a candidate location will determine whether the candidate location is a target location for that item and the user. In other embodiments, additional processing may be utilized as discussed herein for determining whether a candidate location where an item has a high demand indication should be characterized as a target location. In another example, if an item can be characterized as a non-unique item, the determination of whether a candidate location is a target location can be streamlined to bypass one or more blocks of process 500 (e.g., block 506).

Example Process for Preparing Value Proposal

Figure 6:
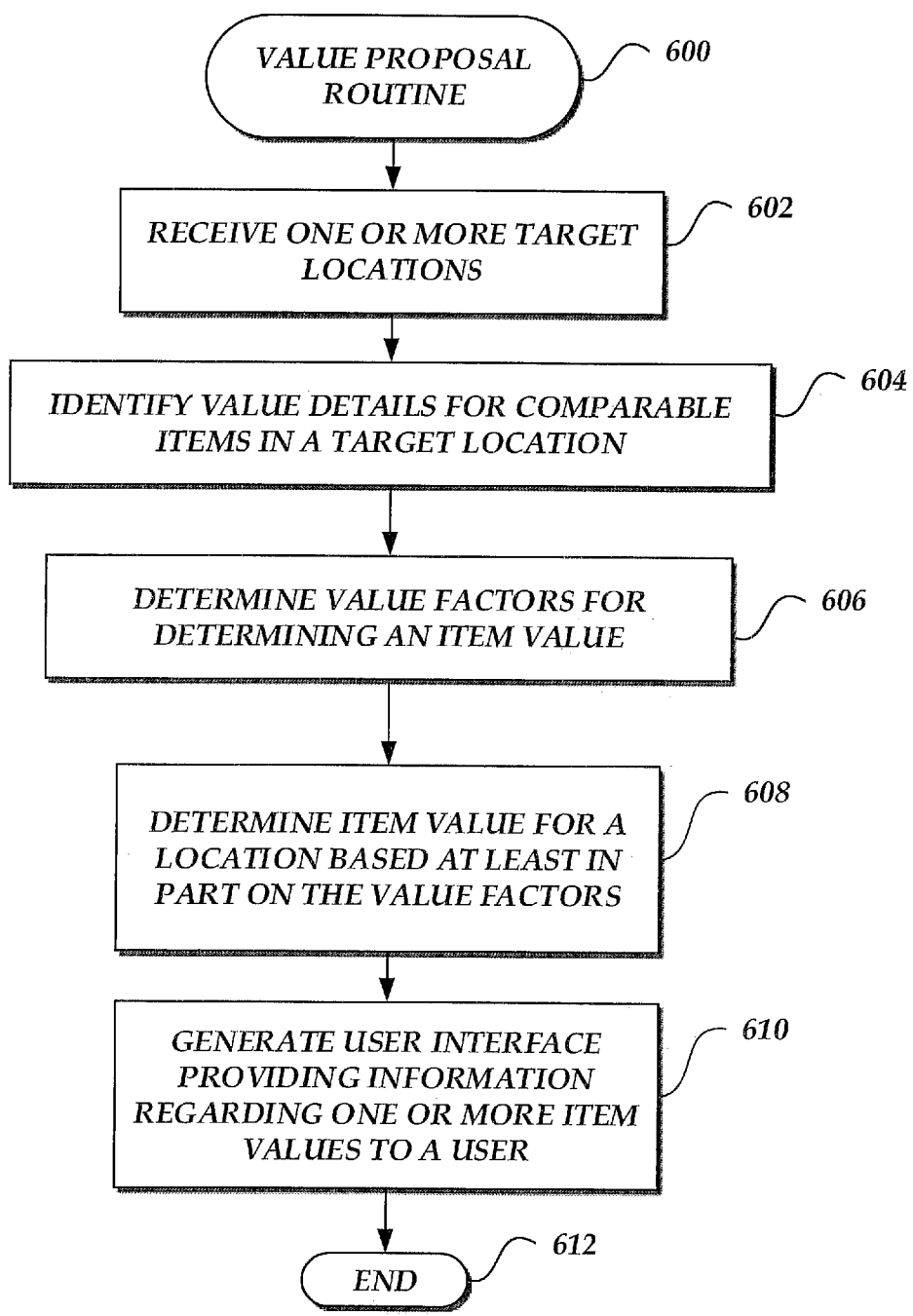
FIG. 6 is a flow diagram showing flow diagram showing an example routine for assessing and proposing a value of an item according to some embodiments.

FIG. 6 is a flow diagram of an illustrative process 600 that may be executed by an item information manager 122 to identify one or more value proposals for a particular item. The process 600 will be described in connection with the example system shown in FIG. 2, and example interface shown in FIG. 7. However, the examples are for illustration only, and are not intended to be limiting. In some embodiments, the process 600 or portions thereof may be used in connection with different geocode hierarchies or data structures, different transformations, different data storage records, etc.

The process 600 shown in FIG. 6 begins at block 602. At block 602, one or more target locations may be received as determined by location information manager 122, for example, as described in connection to FIG. 3 at block 310. At block 604, various value details may be determined for items comparable to the user's item in the target location(s). At block 606, value factors may be determined for determining a proposed item value. Example factors may include shipping cost, tax, currency exchange rate, average selling price, desired profit margin, etc. In some embodiments, this information may be retrieved from a user via a user interface as shown in FIG. 7.

At block 608, a proposed item value may be determined. In some embodiments, the proposed item value may be determined for each location selected by a user. The proposed item value may be in the form of a cost amount or total cost based on a number of items slated for listing.

At block 610, a user interface (as shown in FIG. 10B for example) may be generated providing the proposed value information to a user. For example, an offer for the item in one or more target locations may be automatically generated in accordance with the proposed value rule for the item and on the proposed value for the item. In some embodiments, this user interface precedes the interface shown in FIG. 10B but is similar in content (e.g., providing value and margin information for a target location). In some instances, an ML model is deployed to generate the offer based on the value rule and proposed value for the item and presents to the user an option to accept the offer such that the item is then listed in the target location with the corresponding value that was accepted. Alternatively, a user may reject an offer or further modify the offer once generated by the ML model. Additionally, a user may be given the option to delay accepting the offer until the value of the item or comparable items in the target locations increases or decreases by a predetermined amount. For example, a user may want to set a margin threshold at a higher amount and authorize the system to automatically accept an offer once that margin threshold is realized based on changes in data trends in the target location.

Example Process for Generating a Preview Interface

FIG. 8 is a flow diagram of an illustrative process 800 that may be executed by item information manager 124 and location information manager 122. The process 600 will be described in connection with the example system shown in FIG. 2, and example interface shown in FIGS. 9-10. However, the examples are for illustration only, and are not intended to be limiting. In some embodiments, the process 800 or portions thereof may be used in connection with different geocode hierarchies or data structures, different transformations, different data storage records, etc.

The process 800 shown in FIG. 8 begins at block 802. At block 802, the target locations are received. These target location may be identified by location-computing system 120 as described herein. At block 804, potential obstacles associated with one or more location may be identified. Example obstacles include translation issues, gating issues, or inventory issues such as an item being out of stock. Gating is a mechanism that prevents users from creating offers against certain items or groups of items. At block 806, potential options are identified for mitigating the identified obstacles for each location. For example, the option may include a translation request whereby a user can select to translate. In another example, the option may be to add inventory. At block 808, an information preview page may be generated based on one or more of the identified obstacles. At block 810, the preview page may be presented to a user via a user interface. At block 812, a user may select an option at which point the system will react with adhering to the user's request based on specific software instructions.

In the example user interface shown in FIG. 9A, a user may select the option to add stock as shown in the lower left which can result in the item being moved to the right-hand column under successful synchronization. FIG. 9A is substantially similar to FIG. 9B in that the only different is the movement of the item from left to right based on a user's selection to "add stock." A person of skill in the art will understand that this user interface may include different options arranged in different of ways in accordance with the present disclosure.

Example User Interface for Presenting and Viewing Opportunities

FIGS. 10A and 10B show illustrative examples of information that can be provided to a user via a user interface to determine how best to position an item for maximum potential. For example, in FIG. 10A, the target location is shown to be Canada and the source location is shown to be Great Britain. Thus, the information provided shows how much GMS an item or group of items is predicted (by an ML model) to generate (45.4 k) in the target location based on the recommendations shown to be selected by a user contrasted with the amount (15 k) that will be generated without the recommendation selections.

In the example of FIG. 10B, the target location is France and the option to accept a low-price opportunity in France is presented. Acceptance of the low-price opportunity is predicted to generate 10.4 k in the target location. A low-price opportunity indication is to inform the user that they are not performing as well as they could be based on, for example, the item being listed at an extraordinary price and/or an unusual mark-up/margin. Thus, accepting the suggested price, for example, can improve sales for the item by a quantifiable amount.

Execution Environment

FIG. 11 illustrates an example computing system 1100 configured to execute the processes and implement the features described above in connection with, e.g., the location-computing system and/or the data server. In some embodiments, the computing system 1100 may include: one or more computer processors 1102, such as physical CPUs; one or more network interfaces 1104, such as a network interface cards ("NICs"); one or more computer readable medium drives 1106, such as high density disk drives ("HDDs"), solid state drives ("SDDs"), flash drives, and/or other persistent non-transitory computer-readable media; an input/output device interface 1108, such as an IO interface in communication with one or more external storage drives; and one or more computer readable memories 1110, such as RAM and/or other volatile non-transitory computer-readable media.

The network interface 1104 can provide connectivity to one or more networks or computing systems, such as a data server 104. The computer processor 1102 can receive information and instructions from other computing systems or services via the network interface 1104. The network interface 1104 can also store data directly to the computer-readable memory 1110. The computer processor 1102 can communicate to and from the computer-readable memory 1110, execute instructions and process data in the computer readable memory 1110, etc.

The computer readable memory 1110 may include computer program instructions that the computer processor 1102 executes in order to implement one or more embodiments. The computer readable memory 1110 can store an operating system 1112 that provides computer program instructions for use by the computer processor 1102 in the general administration and operation of the computing system 1100. The computer readable memory 1110 can further include computer program instructions and other information for implementing aspects of the present disclosure. For example, in one embodiment, the computer-readable memory 1110 may include a set of item data processing instructions 1114 that, e.g., implement the demand operations of the process 400. As another example, the computer-readable memory 1110 may also or alternatively include a set of location identification instructions 1116 that, e.g., implement the location-specific operations of one or more of processes 300, 400, 500, 600, 800, manage the processes 300, 400, 500, 600, 800, etc.

In some embodiments, multiple computing systems may communicate with each other via their respective network interfaces 1104 via network 150, and can implement data storage or location and value-related features independently (e.g., each computing system 1100 may execute one or more separate instances of the processes 300, 400, 500, 600, 800, etc.), in parallel (e.g., each manager 122, 124, or 126 or data server 104 may execute a portion of a single instance of one or more of processes 300, 400, 500, 600, 800, etc.), etc. For example, a distributed computing environment may provide hosted capabilities for implementing the systems and methods described herein.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only ("ROM") memory, erasable programmable read-only ("EPROM") memory, electrically erasable programmable read-only ("EEPROM") memory, registers, hard disk, a removable disk, a compact disk read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an application-specific integrated circuit ("ASIC"). The ASIC can reside in a user terminal. In the alternative, the processor device and the storage medium can reside as discrete components in a user terminal.

As described herein, various embodiments may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled or non-touch enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458). The various embodiments of interactive and dynamic user interfaces of the present disclosure are the result of significant research, development, improvement, iteration, and testing and in some embodiments, provide a particular manner of summarizing and presenting information in electronic devices. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized presentation of item specific information in a number of different locations to a user and may enable a user to more quickly access, navigate, assess, and utilize such information than with previous systems which can be slow, complex and/or difficult to learn, particularly to novice users. For example, users would face the problem of having to obtain sales data for all the possible locations that they could possibly be interested in and drill down through many layers to get desired data, in order to receive useful data for determining whether to sell in that location. For example, a person would need to obtain data regarding approximately 150 countries and analyze each one before having a surface level of understanding on whether they should enter an electronic marketplace in that location.

In addition, the task of navigating a large electronic catalog of items (e.g., a catalog with over one thousand items) or other item information database to locate comparable items can be burdensome and time consuming for users, especially if the users do not know the names or generic descriptors of the desired items or the locations for finding this information for each location. Typically, the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest.

In accordance with the present disclosure, users are allowed to more easily see, access and/or specify the most relevant data with respect to location and pricing rules. Further, the interactive and dynamic user interfaces described herein are enabled by innovations in efficient interactions between the user interfaces and underlying systems and components. For example, disclosed herein are improved methods of receiving user inputs, extracting useful information from the user input, correlating such information across various different data structures, delivering the information to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Recommendation algorithms and user interfaces of the type disclosed herein significantly reduce this problem, allowing users to identify locations of interest with fewer steps and with higher confidence that the location will see high performance for an item. For example, in the embodiments described herein, when the user is presented with one or more location recommendations, each location recommendation includes, or is in the form of, a link to connect to the location with a corresponding item, allowing the user to access directly and progress on to a next page where pricing details may be specified. Each recommendation thus serves as a programmatically selected navigational shortcut for connecting to a location, allowing the user to bypass the navigational structure of, for example, the browse tree for each possible location. Beneficially, programmatically identifying locations of interest and presenting the user with navigational shortcuts to connect to these locations can improve the speed of the user's navigation through the acquisition process, rather than requiring the user to page through multiple other pages in order to locate the information necessary to make an informed determination on which location to sell and at what value should be associated with an item. This can be particularly true for computing devices with small screens, where fewer items can be displayed to the user at a time and thus navigation of larger volumes of information is more difficult.

Various embodiments of the present disclosure provide improvements to various technologies and technological fields. For example, as described above, existing offer listing interfaces for multiple locations are limited in various ways (e.g., manual review is slow, costly, inaccessible from a user's perspective and less accurate; data is too voluminous or esoteric; etc.), and various embodiments of the disclosure provide significant improvements over such technology. Additionally, various embodiments of the present disclosure are inextricably tied to computer technology. In particular, various embodiments rely on identification and manipulation of specific data items within potentially disparate data structures. In addition, various embodiments, rely on detection of user inputs via graphical user interfaces, calculation of updates to displayed electronic data based on those user inputs, automatic processing of related electronic data, and presentation of updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data. In addition, a specific manner of displaying a limited set of location and value-based information to a user is disclosed that results in an increased efficiency in displaying and allowing user interactions with multiple locations, such as allowing the user to choose multiple locations to include in a preview snapshot or with opportunities to expand within a location.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   a processor in communication with the computer-readable memory and programmed by the executable instructions to at least:
   receive information regarding an item from a user via a user interface provided to the user, wherein the user interface includes auto-populated user selectable options;
   identify an attribute of the item based at least in part on the information regarding the item;
   apply a first machine learning ("ML") model to a plurality of discrete locations, wherein input to the ML model includes historical data for prior item transactions conducted by the user, wherein output from the first ML model includes a plurality of candidate locations, from the discrete locations, where the user does not offer the item, and wherein application of the first ML model is conducted independent of forecasted demand for the item in the plurality of candidate locations;
   determine, from the plurality of candidate locations output by the first ML model applied to the plurality of discrete locations, a first candidate location in which the user can conduct transactions for the item and a second candidate location in which the user can conduct transactions for the item, wherein:
      the output of the first ML model indicates that the user is likely to begin offering the item in the first candidate location and the second candidate location;
   apply a second ML model to the first candidate location, wherein input to the second ML model includes the attribute of the item and historical data for a first comparable item for the first candidate location, wherein the first comparable item is comparable to the item and is provided in the first candidate location, and wherein a first output from the second ML model includes a first demand value for the item in the first candidate location;
   apply the second ML model to the second candidate location, wherein input to the second ML model includes the attribute of the item and historical data for a second comparable item for the second candidate location, wherein the second comparable item is comparable to the item and is provided in the second candidate location, and wherein a second output from the second ML model includes a second demand value for the item in the second candidate location;
   select, based at least in part on the first demand value and the second demand value, at least one of the first candidate location or the second candidate location as a target location at which the user conducts future transactions for the item;
   generate instructions to automatically display, on the user interface, a user interface element for each candidate location selected as the target location, wherein each user interface element identifies demand information for the item at the corresponding candidate location and an option to initiate an offer for the item in the corresponding candidate location; and
   receive a selection by the user via the user interface based on the user interface element for each candidate location selected as the target location.

2. The system of claim 1, wherein applying the second ML model to output the first demand value comprises identifying one or more comparable items to the item based at least in part on the information regarding the item.

3. The system of claim 1, wherein to select at least one of the first candidate location r the second candidate location as the target location, the one or more processors are programmed by further executable instructions to at least:
   determine that at least one of the first demand value or second demand value satisfies a demand threshold; and
   designate the item as a high demand value in the first candidate location or second candidate location based at least in part on which of the first demand value or second demand value satisfies the demand threshold.

4. The system of claim 1, wherein the one or more processors are programmed by further executable instructions to at least generate instructions to display a second user interface that includes opportunity information for the target location based at least in part on additional item information in the target location.

5. The system of claim 1, wherein the one or more processors are programmed by further executable instructions to at least:
generate instructions to display a second user interface that includes a field for specifying a rule to apply to the item and a control for selecting the target location; and
programmatically generate the offer for the item in the target location in accordance with the rule and the proposed value for the item.

6. The system of claim 1, wherein the first candidate location is associated with an electronic marketplace identified by a first network domain, and wherein the second candidate location is associated with an electronic marketplace identified by a second network domain that is different from the first network domain.

7. A computer-implemented method comprising:
as performed by a computing system configured to execute specific instructions,
receiving information regarding an item from a user via a user interface provided to the user, wherein the user interface includes auto-populated user selectable options;
applying a first machine learning ("ML") model to a plurality of discrete locations, wherein input to the first ML model includes historical data for item transactions for the item conducted by the user in a first location, and wherein output from the ML model includes a plurality of candidate locations, from the discrete locations, where the user does not offer the item, and wherein application of the first ML model is conducted independent of forecasted demand for the item in the plurality of candidate locations;
identifying, from the output of the first ML model applied to the plurality of discrete locations, a candidate location in which the user can offer the item, wherein the first location is different from the candidate location, and wherein the output of the first ML model indicates that the user is likely to begin offering the item in the candidate location,
applying a second ML model to the candidate location, wherein input to the second ML model includes an attribute for the item, and historical data for a comparable item that is comparable to the item and that is provided in the candidate location, and wherein output from the second ML model includes a demand value for the item in the candidate location;
determining, based at least in part on the demand value for the item in the candidate location, that the candidate location is a target location in which the user can conduct transactions for the item;
generating instructions to automatically display, on the user interface, a user interface element for each candidate location selected as the target location, wherein each user interface element identifies demand information for the item at the corresponding candidate location and an option to initiate an offer for the item in the corresponding candidate location; and
receiving a selection by the user via the user interface based on the user interface element for each candidate location selected as the target location.

8. The computer-implemented method of claim 7, further comprising determining a proposed value for the item based at least in part on the historical data for item transactions related to the comparable item.

9. The computer-implemented method of claim 8, further comprising modifying the proposed value based at least in part on a value rule received from the user.

10. The computer-implemented method of claim 7, further comprising:
determining that the demand value satisfies a demand threshold; and
designating the item as having a high demand value in the candidate location based at least in part on the demand value satisfying the demand threshold.

11. The computer-implemented method of claim 7, wherein applying the second ML model to output the demand value for the item further comprises determining that the item is a non-unique item and that the non-unique item has a viewership value that satisfies a predetermined viewership threshold for a predetermined timeframe.

12. The computer-implemented method of claim 7, further comprising generating instructions to display a second user interface that includes information identifying an obstacle to offering the item in the target location and an option for mitigating the obstacle.

13. The computer-implemented method of claim 7, wherein the first location is associated with an electronic marketplace identified by a first network domain, and wherein the candidate location is associated with an electronic marketplace identified by a second network domain.

14. The computer-implemented method of claim 10, further comprising:
applying a third machine learning ("ML") model to the demand threshold, wherein input to the third ML model includes a difference between the item and the comparable item; and
adjusting the demand threshold based at least in part on output of the third ML model,
wherein determining that the demand value satisfies the demand threshold comprises determining that the demand value satisfies the demand threshold adjusted based at least in part on the output of the third ML model.

15. A system comprising:
a computer-readable memory storing executable instructions; and
a processor in communication with the computer-readable memory and programmed by the executable instructions to at least:
receive information regarding an item from a user via a user interface provided to the user, wherein the user interface includes auto-populated user selectable options;
apply a first machine learning ("ML") model to a plurality of discrete locations, wherein input to the first ML model includes historical data for item transactions for the item conducted by the user, and wherein output from the ML model includes a plurality of candidate locations, from the discrete locations, where the user does not offer the item, and wherein application of the first ML model is conducted independent of forecasted demand for the item in the plurality of candidate locations;
identify, from the output of the first ML model applied to the plurality of discrete locations, a first candidate location in which the user can conduct transactions for the item and a second candidate location in which the user can conduct transactions for the item;
apply a second ML model to the first candidate location, wherein input to the second ML model includes an attribute for the item, and historical data for a first comparable item that is comparable to the item and that is provided in the first candidate location, and wherein output from the second ML model includes a demand value for the item in the candidate location;

apply the second ML model to the second candidate location, wherein input to the second ML model includes the attribute for the item, and historical data for a second comparable item that is comparable to the item and that is provided in the second candidate location, and wherein a second output from the second ML model includes a second demand value for the item in the second candidate location;

determine, based at least in part on the first demand value for the item in the first candidate location, that the first candidate location is a first target location in which the user can conduct transactions for the item;

determine, based at least in part on the second demand value for the item in the second candidate location, that the second candidate location is a second target location in which the user can conduct transactions for the item;

generate instructions automatically to display, on the user interface, a user interface element for each candidate location selected as a target location, wherein each user interface element identifies demand information for the item at the corresponding candidate location and an option to initiate an offer for the item in the corresponding candidate location; and receive a selection by the user via the user interface based on the user interface element for each candidate location selected as the target location.

16. The system of claim 15, wherein the one or more processors are programmed by further executable instructions to at least:

identify a potential obstacle associated with at least one of a candidate location or target location; and generate an option to mitigate the potential obstacle.

17. The system of claim 16, wherein the potential obstacle includes one of an out-of-stock obstacle, a language-translation obstacle, or a location-gating obstacle.

18. The system of claim 16, wherein the one or more processors are programmed by further executable instructions to at least:

generate instructions to display a second user interface that includes information identifying the option to mitigate the potential obstacle;

receive a selection of the option via the second user interface; and apply the option to a listing of the item.

19. The system of claim 15, wherein at least one of the first candidate location or the second candidate location is associated with a network domain.

20. The system of claim 15, wherein the one or more processors are programmed by further executable instructions to at least determine, in response to selection of the option for initiating an offer for the item, a proposed value for the item in the target location based at least in part on historical data for a comparable item in the target location.

21. The system of claim 1, wherein the one or more processors are programmed by further executable instructions to at least:

determine that the first demand value for the item satisfies a demand threshold; and identify the item as in high demand in the first target location.

22. The system of claim 21, wherein to determine that the first demand value for the item satisfies the demand threshold, the one or more processors are programmed by further executable instructions to at least:

apply a third machine learning ("ML") model to the demand threshold, wherein input to the third ML includes at least one of a subset of historical data for prior item transactions conducted in the first candidate location or interest data for the item;

adjust the demand threshold based at least in part on the output of the third ML model; and determine that the first demand value for the item satisfies the demand threshold adjusted based at least in part on the output of the third ML model.

* * * * *